(12) United States Patent
Fukushi et al.

(10) Patent No.: US 11,739,866 B2
(45) Date of Patent: Aug. 29, 2023

(54) ELECTRIC RESISTANCE WELDED STEEL PIPE FOR TORSION BEAM

(71) Applicant: NIPPON STEEL CORPORATION, Tokyo (JP)

(72) Inventors: Takaaki Fukushi, Tokyo (JP); Noboru Hasegawa, Tokyo (JP); Manabu Wada, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 227 days.

(21) Appl. No.: 17/268,285

(22) PCT Filed: Oct. 12, 2018

(86) PCT No.: PCT/JP2018/038166
§ 371 (c)(1),
(2) Date: Feb. 12, 2021

(87) PCT Pub. No.: WO2020/075297
PCT Pub. Date: Apr. 16, 2020

(65) Prior Publication Data
US 2021/0324979 A1    Oct. 21, 2021

(51) Int. Cl.
*F16L 13/02* (2006.01)
*C22C 38/32* (2006.01)
(Continued)

(52) U.S. Cl.
CPC .......... *F16L 13/0281* (2013.01); *C21D 6/002* (2013.01); *C21D 6/005* (2013.01);
(Continued)

(58) Field of Classification Search
CPC ........ C21D 6/002; C21D 6/005; C21D 6/008; C21D 8/105; C21D 9/08; C21D 9/46;
(Continued)

(56) References Cited

U.S. PATENT DOCUMENTS

2016/0230241 A1 * 8/2016 Fukushi ................. C21D 8/105
2019/0217424 A1    7/2019 Fukushi et al.

FOREIGN PATENT DOCUMENTS

EP    3546610 A1    10/2019
JP    2018145490 A * 9/2018
(Continued)

*Primary Examiner* — Jenny R Wu
(74) *Attorney, Agent, or Firm* — Solaris Intellectual Property Group, PLLC

(57) ABSTRACT

An electric resistance welded steel pipe for a torsion beam, in which a chemical composition of a base metal portion contains, in terms of % by mass, 0.05 to 0.30% of C, 0.03 to 1.20% of Si, 0.30 to 2.50% of Mn, 0.010 to 0.200% of Ti, 0.005 to 0.500% of Al, 0.010 to 0.040% of Nb, and 0.0005 to 0.0050 % of B, the balance containing Fe and impurities, wherein: $V_{c90}$, defined by the following Formula (i), is from 2 to 150, a mass ratio Ti/N is 3.4 or more, a microstructure of a wall thickness central portion in an L cross section at a base metal 1800 position is a tempered martensite, an average aspect ratio of prior γ grains in the tempered martensite is 2.0 or less, and a tensile strength in the pipe axis direction is from 750 to 980 MPa:

$\log V_{c90} = 2.94 - 0.75\beta a$    Formula (i)

$\beta a = 2.7C + 0.4Si + Mn + 0.45Ni + 0.8Cr + 2Mo$    Formula (ii).

8 Claims, 3 Drawing Sheets

(51) Int. Cl.
| | |
|---|---|
| *C22C 38/20* | (2006.01) |
| *C22C 38/26* | (2006.01) |
| *C21D 6/00* | (2006.01) |
| *C21D 8/10* | (2006.01) |
| *C21D 9/08* | (2006.01) |
| *C21D 9/50* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/08* | (2006.01) |
| *C22C 38/12* | (2006.01) |
| *C22C 38/14* | (2006.01) |
| *C22C 38/28* | (2006.01) |

(52) U.S. Cl.
CPC ............. *C21D 6/008* (2013.01); *C21D 8/105* (2013.01); *C21D 9/08* (2013.01); *C21D 9/50* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/20* (2013.01); *C22C 38/26* (2013.01); *C22C 38/28* (2013.01); *C22C 38/32* (2013.01); *F16L 13/0245* (2013.01)

(58) Field of Classification Search
CPC ......... C21D 9/50; C22C 38/00; C22C 38/001; C22C 38/002; C22C 38/005; C22C 38/02; C22C 38/04; C22C 38/06; C22C 38/08; C22C 38/12; C22C 38/14; C22C 38/20; C22C 38/26; C22C 38/28; C22C 38/32; C22C 38/58; F16L 13/0245; F16L 13/0281

See application file for complete search history.

(56) References Cited

FOREIGN PATENT DOCUMENTS

| | | |
|---|---|---|
| WO | 2009133965 A1 | 11/2009 |
| WO | 2018/066249 A1 | 4/2018 |
| WO | 2018/179169 A1 | 10/2018 |

* cited by examiner

ELECTRIC RESISTANCE WELDED STEEL PIPE FOR TORSION BEAM

This is a National Phase Application filed under 35 U.S.C. § 371, of International Application No. PCT/JP2018/038166, filed Oct. 12, 2018, the contents of which are incorporated by reference.

TECHNICAL FIELD

The present disclosure relates to an electric resistance welded steel pipe for a torsion beam.

BACKGROUND ART

Conventionally, studies have been made on steel materials used for automobile structural members (for example, automotive underbody parts).

For example, Patent Document 1 discloses a hot-rolled steel sheet for a mechanical structure steel pipe excellent in fatigue characteristics and bending formability, which is used for a mechanical structure steel pipe such as an automotive underbody part steel pipe.

Patent Document 1: International Publication No. WO 2009/133965

SUMMARY OF INVENTION

Technical Problem

High tensile strength (in particular, tensile strength in the pipe axis direction) is required for a torsion beam, which is one of automotive underbody parts.

Meanwhile, a torsion beam may be produced by processing an electric resistance welded steel pipe for torsion beam by bending forming. In such a case, cracks (hereinafter also referred to as "inner surface cracks") may be generated on the inner surface of the bent-formed portion (hereinafter also referred to as "bent portion") of the electric resistance welded steel pipe. From the viewpoint of bending formability of an electric resistance welded steel pipe, there are cases in which it is required to improve the inner surface crack resistance of an electric resistance welded steel pipe.

The term "inner surface cracking resistance" used herein means a property capable of suppressing inner surface cracking when processing an electric resistance welded steel pipe by bending forming.

In Patent Document 1, no examination has been made from the viewpoint of improving the inner surface cracking resistance of the steel pipe, leaving room for further improvement.

An object of the disclosure is to provide an electric resistance welded steel pipe for a torsion beam having excellent tensile strength in a pipe axis direction and also excellent inner surface cracking resistance.

Solution to Problem

Means for solving the problem described above includes the following aspects.

<1> An electric resistance welded steel pipe for a torsion beam, the steel pipe comprising a base metal portion and an electric resistance welded portion, wherein a chemical composition of the base metal portion consists of, in terms of % by mass:
0.05 to 0.30% of C,
0.03 to 1.20% of Si,
0.30 to 2.50% of Mn,
0 to 0.030% of P,
0 to 0.010% of S,
0.010 to 0.200% of Ti,
0.005 to 0.500% of Al,
0.010 to 0.040% of Nb.
0 to 0.006% of N,
0.0005 to 0.0050% of B.
0 to 1.000% of Cu,
0 to 1.000% of Ni.
0 to 1.00% of Cr,
0 to 0.50% of Mo,
0 to 0.200% of V,
0 to 0.100% of W.
0 to 0.0200% of Ca.
0 to 0.0200% of Mg,
0 to 0.0200% of Zr,
0 to 0.0200% of REM, and,
a balance consisting of Fe and impurities, wherein:
$V_{c90}$, defined by the following Formula (i), is from 2 to 150,
a mass ratio of Ti content to N content is 3.4 or more,
a metallographic microstructure of a wall thickness central portion is a tempered martensite structure, and an average aspect ratio of prior austenite grains in the tempered martensite structure is 2.0 or less, in an L cross section at a position deviating by 180° in a circumferential direction of the pipe from the electric resistance welded portion.
a metallographic microstructure of an area within a distance corresponding to a wall thickness from the electric resistance welded portion in a wall thickness central portion in a C cross section includes a tempered martensite and at least one of a tempered bainite or a ferrite,
yield elongation is observed when a tensile test in a pipe axis direction is performed, and
a tensile strength in the pipe axis direction is from 750 to 980 MPa:

$$\log V_{c90} = 2.94 - 0.75\beta a \qquad \text{Formula (i)}$$

$$\beta a = 2.7C + 0.4Si + Mn + 0.45Ni + 0.8Cr + 2Mo \qquad \text{Formula (ii)}$$

wherein, in Formula (i), Pa represents a value defined by Formula (ii), and in Formula (ii), element symbols represent % by mass of respective elements.

<2> The electric resistance welded steel pipe for a torsion beam according to <1>, wherein the chemical composition of the base metal portion contains, in terms of % by mass, at least one selected from the group consisting of:
more than 0% but equal to or less than 1.000% of Cu,
more than 0% but equal to or less than 1.000% of Ni,
more than 0% but equal to or less than 1.00% of Cr,
more than 0% but equal to or less than 0.50% of Mo,
more than 0% but equal to or less than 0.200% of V,
more than 0% but equal to or less than 0.100% of W,
more than 0% but equal to or less than 0.0200% of Ca.
more than 0% but equal to or less than 0.0200% of Mg,
more than 0% but equal to or less than 0.0200% of Zr, and
more than 0% but equal to or less than 0.0200% of REM.

<3> The electric resistance welded steel pipe for a torsion beam according to <1> or <2>, wherein packet grains in the tempered martensite structure have an average grain size of 10 μm or less.

<4> The electric resistance welded steel pipe for a torsion beam according to any one of <1> to <3>, wherein the wall thickness central portion in the L cross section has a dislocation density of $2.0 \times 10^{14}$ m$^{-2}$ or less.

<5> The electric resistance welded steel pipe for a torsion beam according to any one of <1> to <4>, which has an outer diameter of from 50 to 150 mm and a wall thickness of from 2.0 to 4.0 mm.

Advantageous Effects of Invention

According to the disclosure, an electric resistance welded steel pipe for a torsion beam having excellent tensile strength in a pipe axis direction and also excellent inner surface cracking resistance is provided.

DESCRIPTION OF EMBODIMENTS

Figure 1:
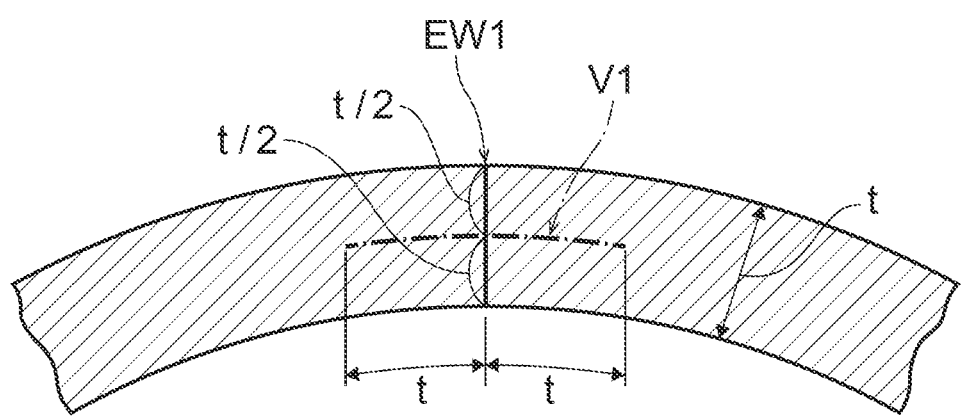
FIG. 1 is a schematic cross-sectional view conceptually showing a part of the C cross section of the electric resistance welded steel pipe according to an example of the disclosure, which is a figure for explaining an area within a distance corresponding to a wall thickness from the electric resistance welded portion (i.e., a vicinity of the electric resistance welded portion) in a wall thickness central portion in a C cross section.

A numerical range expressed by "x to y" herein includes the values of x and y in the range as the minimum and maximum values, respectively.

The term "step" herein encompasses not only an independent step but also a step of which the desired object is achieved even in a case in which the step is incapable of being definitely distinguished from another step.

In the numerical ranges described herein as stepwise ranges, the upper limit value or the lower limit value of a certain stepwise numerical range may be replaced by the upper limit value or the lower limit value of a different stepwise numerical range, and may also be replaced by a value set forth in Examples.

The content of a component (element) expressed by "%" herein means "% by mass".

The content of C (carbon) may be herein occasionally expressed as "C content". The content of another element may be expressed similarly.

Herein, the "L cross section" refers to a cross section parallel to a pipe axis direction and a wall thickness direction, and the "C cross section" refers to a cross section perpendicular to a pipe axis direction.

The electric resistance welded steel pipe for a torsion beam (hereinafter also simply referred to as "electric resistance welded steel pipe") of the disclosure includes a base metal portion and an electric resistance welded portion, wherein a chemical composition of the base metal portion consists of, in terms of % by mass: 0.05 to 0.30% of C, 0.03 to 1.20% of Si, 0.30 to 2.50% of Mn, 0 to 0.030% of P, 0 to 0.010% of S, 0.010 to 0.200% of Ti, 0.005 to 0.500% of Al, 0.010 to 0.040% of Nb, 0 to 0.006% of N, 0.0005 to 0.0050% of B, 0 to 1.000% of Cu, 0 to 1.000% of Ni, 0 to 1.00% of Cr, 0 to 0.50% of Mo, 0 to 0.200% of V, 0 to 0.100% of W, 0 to 0.0200% of Ca, 0 to 0.0200% of Mg, 0 to 0.0200% of Zr, REM: 0 to 0.0200%, and a balance consisting of Fe and impurities, wherein: $V_{c90}$, defined by the following Formula (i), is from 2 to 150, a mass ratio of Ti content to N content is 3.4 or more, a metallographic microstructure of a wall thickness central portion is a tempered martensite structure, and an average aspect ratio of prior austenite grains in the tempered martensite structure is 2.0 or less, in an L cross section at a position deviating by 180° in a circumferential direction of the pipe from the electric resistance welded portion, a metallographic microstructure of an area within a distance corresponding to a wall thickness from the electric resistance welded portion in a wall thickness central portion in a C cross section includes a tempered martensite and at least one of a tempered bainite or a ferrite, yield elongation is observed when a tensile test in a pipe axis direction is performed, and a tensile strength in the pipe axis direction is from 750 to 980 MPa.

$$\log V_{c90} = 2.94 - 0.75\beta a \qquad \text{Formula (i)}$$

$$\beta a = 2.7C + 0.4Si + Mn + 0.45Ni + 0.8Cr + 2Mo \qquad \text{Formula (ii)}$$

In Formula (i), Pa represents a value defined by Formula (ii), and in Formula (ii), element symbols represent % by mass of respective elements.

Herein, the chemical composition of the base metal portion described above (including that $V_{c90}$ is from 2 to 150 and that the mass ratio of Ti content to N content is 3.4 or more) is also referred to as "chemical composition in the disclosure."

The electric resistance welded steel pipe of the disclosure comprises a base metal portion and an electric resistance welded portion.

An electric resistance welded steel pipe is generally produced by forming a hot-rolled steel sheet into a tubular shape (hereinafter also referred to as "roll-forming") to thereby make an open pipe, and processing abutting portions of the obtained open pipe by electric resistance welding to form an electric resistance welded portion (hereinafter, the process up to this point is also referred to as "pipe-making"), and then, if necessary, performing seam heat treatment of the electric resistance welded portion.

The electric resistance welded steel pipe of the disclosure is produced by performing tempering after pipe-making (seam heat treatment in a case in which seam heat treatment is performed) (hereinafter also referred to as "tempering after pipe-making").

In the electric resistance welded steel pipe of the disclosure, the base metal portion refers to a portion other than the electric resistance welded portion and a heat affected zone.

The heat affected zone (hereinafter also referred to as "HAZ") refers to a portion affected by heat caused by electric resistance welding (affected by heat caused by the electric resistance welding and seam heat treatment in a case in which the seam heat treatment is performed after the electric resistance welding).

The heat affected zone described herein and an area within a distance corresponding to a wall thickness from an electric resistance welded portion described later (hereinafter also referred to as a "vicinity of an electric resistance welded portion") have an overlapping portion.

The hot-rolled steel sheet, which is a material of an electric resistance welded steel pipe, is manufactured by using a hot strip mill. Specifically, a long hot-rolled steel sheet coiled into a coil (hereinafter, also referred to as a "hot coil") is produced by a hot strip mill.

A hot-rolled steel sheet, which is a material of an electric resistance welded steel pipe, is different from a steel plate produced by using a plate mill in that it is a continuous steel sheet.

Since a steel plate is not a continuous steel sheet, it cannot be used for roll-forming, which is a continuous bending process.

An electric resistance welded steel pipe is clearly distinguished from a welded steel pipe (e.g., UOE steel pipe) produced by using a steel plate in that it is produced by using the hot-rolled steel sheet described above.

The electric resistance welded steel pipe of the disclosure has excellent tensile strength in a pipe axis direction (specifically, a tensile strength in a pipe axis direction of 750 MPa or more) and also excellent inner surface cracking resistance.

The reason for obtaining these effects are assumed as follows. However, the electric resistance welded steel pipe of the disclosure is not limited to the following assumed reasons.

The effect of excellent tensile strength in the pipe axis direction is attributed to that the base metal portion has the chemical composition in the disclosure, and that the metallographic microstructure of the wall thickness central portion in the L cross section is the tempered martensite structure.

The effect of excellent inner surface cracking resistance is attributed to that the metallographic microstructure of the wall thickness central portion in the L cross section at the position deviating by 180° in the circumferential direction of the pipe from the electric resistance welded portion (hereinafter also referred to as "base metal 180° position") is a tempered martensite structure.

The base metal 180° position refers herein to a position selected as a representative position of the base metal portion.

In contrast to the electric resistance welded steel pipe of the disclosure, in a case in which the metallographic microstructure of a wall thickness central portion in the L cross section at the base metal 180° position has a dual-phase structure consisting of, for example, a tempered martensite and another structure (e.g., a ferrite, a tempered bainite, or the like), the inner surface cracking resistance deteriorates. This is thought to be because during bending forming of an electric resistance welded steel pipe, forming strain due to bending forming is concentrated on the boundary between two structures having different hardness on the inner surface of the bent portion and its vicinity, and as a result, inner surface cracking is likely to occur.

In addition, it is thought that the effect of excellent inner surface cracking resistance is also attributed to that the average aspect ratio of prior austenite grains in the tempered martensite structure is 2.0 or less.

In contrast to the electric resistance welded steel pipe of the disclosure, in a case in which the average aspect ratio of prior austenite grains in the tempered martensite structure in the metallographic microstructure of a wall thickness central portion in the L cross section exceeds 2.0, the inner surface cracking resistance deteriorates.

This is thought to be because in a case in which the average aspect ratio of prior austenite grains exceeds 2.0 (i.e., in a case in which prior austenite is elongated), the aspect ratio of packet grains in prior austenite grains also increases (i.e., packet grains are also elongated), and as a result, the packet grain boundary is easily continuous. It is therefore considered that during bending forming, the tearing of the packet grain boundary tends to extend along the packet grain boundary in the inner surface of the bent portion and its vicinity, and as a result, the inner surface cracking which is continuous cracking tends to occur.

In the electric resistance welded steel pipe of the disclosure, the average aspect ratio of prior austenite grains is set to 2.0 or less, and thereby, the shape of the packet grains in prior austenite grains is made closer to a spherical shape. As a result, it is considered that the continuity of the packet grain boundary is suppressed, the extension of the tearing of the packet grain boundary described above is suppressed, and as a result, the inner surface cracking is suppressed (i.e., the inner surface cracking resistance is improved).

The tempered martensite structure of the wall thickness central portion in the L cross section at the base metal 180° position is structured with a combination of the chemical composition in the disclosure and the electric resistance welded steel pipe production conditions (including conditions of producing a hot-rolled steel sheet which is a material of an electric resistance welded steel pipe).

Specifically, in the hot rolling process and cooling process for producing a hot-rolled steel sheet having the chemical composition in the disclosure, substantial quenching is performed, and an as-quenched martensite structure (i.e., an untempered martensite structure; the same applies hereinafter) is structured as the structure of the base metal portion (typically, at the base metal 180° position), and then, a tempered martensite structure is created by tempering after pipe-making.

In addition, it is possible to achieve an average aspect ratio of prior austenite grains in the tempered martensite structure of 2.0 or less as described above by performing rolling in a recrystallization region in the hot rolling process (e.g., by setting the hot rolling finishing temperature to 920° C. or higher).

An example of the method of producing the electric resistance welded steel pipe of the disclosure will be described later.

In the electric resistance welded steel pipe of the disclosure, a metallographic microstructure of a vicinity of an electric resistance welded portion (i.e., an area within a distance corresponding to a wall thickness from the electric resistance welded portion) in a wall thickness central portion in a C cross section includes a tempered martensite and at least one of a tempered bainite or a ferrite.

The metallographic microstructure of the vicinity of the electric resistance welded portion includes at least one of a tempered bainite or a ferrite, which indicates that the electric resistance welded steel pipe of the disclosure is an electric resistance welded steel pipe that has been tempered without quenching after pipe making.

In contrast to the electric resistance welded steel pipe of the disclosure, in the case of an electric resistance welded steel pipe that has been quenched and tempered after-pipe making, a vicinity of an electric resistance welded portion has a tempered martensite structure which is substantially free of a tempered bainite and a ferrite.

A production method for producing the electric resistance welded steel pipe of the disclosure by performing tempering without quenching after pipe-making is superior in productivity as compared with a production method in which quenching and tempering are performed after pipe-making.

In other words, the electric resistance welded steel pipe of the disclosure is also advantageous in that it is excellent in economy (i.e., low cost) because it can be produced by a production method which is more productive than a production method in which quenching and tempering are performed after pipe-making.

In addition, in the electric resistance welded steel pipe of the disclosure, yield elongation is observed when a tensile test in the pipe axis direction is performed, which also indicates that the electric resistance welded steel pipe of the disclosure is an electric resistance welded steel pipe that has been tempered without quenching after pipe-making.

In contrast to the electric resistance welded steel pipe of the disclosure, yield elongation is not observed in a case in which a tensile test in the pipe axis direction is performed on an electric resistance welded steel pipe that has been tempered before pipe-making (i.e., a hot-rolled steel sheet as a material of the pipe has been tempered) but has not been tempered after pipe-making (see, for example, Comparative Example 25 described later).

The electric resistance welded steel pipe of the disclosure is superior in inner surface cracking resistance as compared with an electric resistance welded steel pipe that has been tempered before pipe-making but has not been tempered after pipe-making. This is thought to be because, in the electric resistance welded steel pipe of the disclosure, the pipe-making strain generated during pipe-making is reduced by tempering after pipe-making, thereby reducing the dislocation density.

<Chemical Composition of Base Metal Portion>

The chemical composition of the base metal portion of the electric resistance welded steel pipe of the disclosure (i.e., "chemical composition in the disclosure") is described below.

C: 0.05 to 0.30%

C is an element for improving the strength of steel. In a case in which the C content is less than 0.05%, the strength required for a torsion beam might not be achieved. Accordingly, the C content is 0.05% or more. The C content is preferably 0.08% or more, and more preferably 0.10% or more.

Meanwhile, in a case in which the C content exceeds 0.30%, the strength might be excessively increased, resulting in deterioration of inner surface cracking resistance. Accordingly, the C content is 0.30% or less. The C content is preferably 0.25% or less, and more preferably 0.20% or less.

Si: 0.03 to 1.20%

Si is an element used for deoxidation. In a case in which the Si content is less than 0.03%, deoxidation might become insufficient, resulting in generation of a coarse Fe-oxide. Accordingly, the Si content is 0.03% or more. The Si content is preferably 0.10% or more, and more preferably 0.20% or more.

Meanwhile, in a case in which the Si content exceeds 1.20%, it might cause generation of an inclusion such as $SiO_2$, thereby facilitating generation of microvoids starting from the inclusion during roll-forming for producing an electric resistance welded steel pipe and/or bending forming on an electric resistance welded steel pipe. Accordingly, the Si content is 1.20% or less. The Si content is preferably 1.00% or less, and more preferably 0.80% or less.

Mn: 0.30 to 2.50%

Mn is an important element for enhancing hardenability to improve the strength of steel, and eventually (i.e., by tempering after pipe-forming) to obtain a tempered martensite structure. If the Mn content is less than 0.30%, hardenability may be insufficient, and a tempered martensite structure may not be obtained. Accordingly, the Mn content is 0.30% or more. The Mn content is preferably 0.60% or more, and more preferably 0.70% or more.

Meanwhile, in a case in which the Mn content exceeds 2.50%, the strength might be excessively increased, resulting in deterioration of inner surface cracking resistance. Accordingly, the Mn content is 2.50% or less. The Mn content is preferably 2.00% or less, more preferably 1.50% or less, and still more preferably 1.30% or less.

P: 0 to 0.030%

P is an element that can be contained as an impurity in steel. In a case in which the P content exceeds 0.030%, it might facilitate concentration of P in the packet grain boundary, resulting in deterioration of inner surface cracking resistance. Accordingly, the P content is 0.030% or less. The P content is preferably 0.020% or less.

Meanwhile, the P content may be 0%. From the viewpoint of reducing a dephosphorization cost, the P content may be more than 0%, 0.001% or more, or 0.010% or more.

S: 0 to 0.010%

S is an element that can be contained as an impurity in steel.

In a case in which the S content exceeds 0.010%, it might cause generation of coarse MnS, resulting in deterioration of inner surface cracking resistance. Accordingly, the S content is 0.010% or less. The S content is preferably 0.005% or less.

Meanwhile, the S content may be 0%. From the viewpoint of reducing a desulfurization cost, the S content may be more than 0%, 0.001% or more, or 0.003% or more.

Ti: 0.010 to 0.200%

Ti is an element that improves the strength of steel by precipitating as TiC. Ti is also an element that contributes to austenite grain size refining through the pinning effect in hot rolling, and as a result, contributes to refining of packet grains in prior austenite grains. In a case in which the Ti content is less than 0.010%, the strength required for a torsion beam and the pinning effect on austenite grains might not be achieved. In addition, in a case in which the Ti content is less than 0.010%, since N cannot be fixed as TiN and N precipitates together with B (i.e., BN is formed), an effective amount of B that contributes to the improvement of hardenability cannot be secured, and as a result, the effect of improving hardenability by B may not be obtained. Accordingly, the Ti content is 0.010% or more. The Ti content is preferably 0.015% or more.

Meanwhile, in a case in which the Ti content exceeds 0.200%, it might cause precipitation of coarse TiC and/or TiN, resulting in deterioration of inner surface cracking resistance. Accordingly, the Ti content is 0.200% or less. The Ti content is preferably 0.150% or less, more preferably 0.120% or less, still more preferably 0.100% or less, and furthermore preferably 0.080% or less.

Al: 0.005 to 0.500%

Al is an element that forms AlN, contributes to austenite grain size refining through the pinning effect in hot rolling, and as a result, contributes to refining of packet grains in prior austenite grains. In a case in which the Al content is less than 0.005%, the pinning effect on austenite grains cannot be obtained, which results in coarse prior austenite grains, and as a result, packet grains may become coarse. Accordingly, the Al content is 0.005% or more. The Al content is preferably 0.010% or more, and more preferably 0.020% or more.

Meanwhile, in a case in which the Al content exceeds 0.500%, it might cause precipitation of coarse AlN resulting in deterioration of inner surface cracking resistance. Accordingly, the Al content is 0.500% or less. The Al content is preferably 0.100% or less, and more preferably 0.050% or less.

Nb: 0.010 to 0.040%

Nb is an element that forms NbC, contributes to austenite grain size refining through the pinning effect in hot rolling, and as a result, contributes to refining of packet grains in prior austenite grains. In a case in which the Nb content is less than 0.010%, the pinning effect on austenite grains cannot be obtained, which results in coarse prior austenite grains, and as a result, packet grains may become coarse. Accordingly, the Nb content is 0.010% or more. The Nb content is preferably 0.020% or more.

Meanwhile, in a case in which the Nb content exceeds 0.040%, it might cause precipitation of coarse NbC resulting in deterioration of inner surface cracking resistance. Accordingly, the Nb content is 0.040% or less. The Nb content is preferably 0.036% or less.

N: 0 to 0.006%

N is an element that can be contained as an impurity in steel. In a case in which the N content exceeds 0.006%, it might cause generation of coarse AlN, resulting in deterioration of inner surface cracking resistance. Accordingly, the N content is 0.006% or less.

The N content may also be 0%.

N is an element that forms AlN, contributes to austenite grain size refining through the pinning effect in hot rolling, and as a result, it is also an element that contributes to refining of packet grains in prior austenite grains. From the viewpoint of such an effect, the N content may be more than 0%, or 0.001% or more.

B: 0.0005 to 0.0050%

B is an element that improves the hardenability of steel, and is an essential element for creating an as-quenched martensite structure in the hot rolling process and cooling process for producing a hot-rolled steel sheet that is a material for an electric resistance welded steel pipe. In a case in which the B content is less than 0.0005%, the effect may not be obtained. Accordingly, the B content is 0.0005% or more. The B content is preferably 0.0010% or more.

Meanwhile, in a case in which the B content exceeds 0.0050%, since B aggregates and/or precipitates and the solid solution B segregated at the austenite grain boundary decreases, the effect of improving the hardenability of steel may decrease. Accordingly, the B content is, 0.0050% or less. The B content is preferably 0.0040% or less, and more preferably 0.0030% or less.

Cu: 0 to 1.000%

Cu is an optional element, and thus it may not be contained. In other words, the Cu content may be 0%.

Cu is an element that contributes to enhancement of the strength of steel. From the viewpoint of such an effect, the Cu content may be more than 0%, 0.005% or more, 0.010% or more, or 0.050% or more.

Meanwhile, in a case in which the Cu content is excessively increased, it might cause saturation of the effect, leading to cost increase. Accordingly, the Cu content is 1.000% or less. The Cu content is preferably 0.500% or less, more preferably 0.300% or less, and still more preferably 0.200% or less.

Ni: 0 to 1.000%

Ni is an optional element, and thus it may not be contained. In other words, the Ni content may be 0%.

Ni is an element that contributes to enhancement of the strength of steel. From the viewpoint of such an effect, the Ni content may be more than 0%, 0.005% or more, 0.010% or more, or 0.050% or more.

Meanwhile, in a case in which the Ni content is excessively increased, it might cause saturation of the effect, leading to cost increase. Accordingly, the Ni content is 1.000% or less. The Ni content is preferably 0.500% or less, more preferably 0.300% or less, and still more preferably 0.200% or less.

Cr: 0 to 1.00%

Cr is an optional element, and thus it may not be contained. In other words, the Cr content may be 0%.

Cr is an element that contributes to enhancement of the strength of steel. From the viewpoint of such an effect, the Cr content may be more than 0%, 0.005% or more, 0.01% or more, or 0.05% or more.

Meanwhile, in a case in which the Cr content is excessively increased, it might cause saturation of the effect, leading to cost increase. Accordingly, the Cr content is 1.00% or less. The Cr content is preferably 0.50% or less, more preferably 0.30% or less, and still more preferably 0.20%.

Mo: 0 to 0.50%

Mo is an optional element, and thus it may not be contained. In other words, the Mo content may be 0%.

Mo is an element that contributes to enhancement of the strength of steel. From the viewpoint of such an effect, the Mo content may be more than 0%, 0.01% or more, 0.05% or more, or 0.10% or more.

Meanwhile, in a case in which the Mo content is excessively increased, it might cause saturation of the effect, leading to cost increase. Accordingly, the Mo content is 0.50% or less. The Mo content is preferably 0.40% or less.

V: 0 to 0.200%

V is an optional element, and thus it may not be contained. In other words, the V content may be 0%.

V is an element that contributes to enhancement of the strength of steel. From the viewpoint of such an effect, the V content may be more than 0%, or 0.005% or more.

Meanwhile, in a case in which the V content is excessively increased, it might cause saturation of the effect, leading to cost increase. Accordingly, the V content is 0.200% or less. The V content is preferably 0.100% or less, and more preferably 0.050% or less.

W: 0 to 0.100%

W is an optional element, and thus it may not be contained. In other words, the W content may be 0%.

W is an element that contributes to enhancement of the strength of steel. From the viewpoint of such an effect, the W content may be more than 0%, or 0.005% or more.

Meanwhile, in a case in which the W content is excessively increased, it might cause saturation of the effect, leading to cost increase. Accordingly, the W content is 0.100% or less. The W content is preferably 0.050% or less.

Ca: 0 to 0.0200%

Ca is an optional element, and thus it may not be contained. In other words, the Ca content may be 0%.

Ca has effects of controlling an inclusion and further suppressing inner surface cracking resistance. From the viewpoint of such an effect, the Ca content may be more than 0%, 0.0001% or more, or 0.0010% or more.

Meanwhile, in a case in which the Ca content is excessively increased, it might cause generation of coarse Ca-oxide, resulting in deterioration of inner surface cracking resistance. Accordingly, the Ca content is 0.0200% or less. The Ca content is preferably 0.0100% or less, and more preferably 0.0070% or less.

Mg: 0 to 0.0200%

Mg is an optional element, and thus it may not be contained. In other words, the Mg content may be 0%.

Mg has effects of controlling an inclusion and further suppressing inner surface cracking resistance. From the viewpoint of such an effect, the Mg content may be more than 0%, or 0.0001% or more.

Meanwhile, in a case in which the Mg content is excessively increased, it might cause saturation of the effect, leading to cost increase. Accordingly, the Mg content is 0.0200% or less. The Mg content is preferably 0.0100% or less, more preferably 0.0050% or less, and still more preferably 0.0020% or less.

Zr: 0 to 0.0200%

Zr is an optional element, and thus it may not be contained. In other words, the Zr content may be 0%.

Zr has effects of controlling an inclusion and further suppressing inner surface cracking resistance. From the viewpoint of such an effect, the Zr content may be more than 0%, or 0.0001% or more.

Meanwhile, in a case in which the Zr content is excessively increased, it might cause saturation of the effect, leading to cost increase. Accordingly, the Zr content is 0.0200% or less. The Zr content is preferably 0.0100% or less, more preferably 0.0050% or less, and still more preferably 0.0020% or less.

REM: 0 to 0.0200%

REM is an optional element, and thus it may not be contained. In other words, the REM content may be 0%.

"REM" refers to a rare earth element, i.e., at least one element selected from the group consisting of Sc, Y, La. Ce, Pr, Nd, Pm, Sm, Eu, Gd, Tb, Dy, Ho, Er, Tm, Yb, and Lu.

REM has effects of controlling an inclusion and further suppressing inner surface cracking resistance. From the viewpoint of such an effect, the REM content may be more than 0%, 0.0001% or more, or 0.0005% or more.

Meanwhile, in a case in which the REM content is excessively increased, it might cause generation of coarse oxide, resulting in deterioration of inner surface cracking resistance. Accordingly, the REM content is 0.0200% or less. The REM content is preferably 0.0100% or less, more preferably 0.0050% or less, and still more preferably 0.0020% or less.

Balance: Fe and Impurities

In the chemical composition of the base metal portion, the balance excluding each element described above is Fe and impurities.

The impurities refer to components which are contained in a raw material (for example, ore, scrap, or the like) or mixed into in a production step, and which are not intentionally incorporated into a steel.

Examples of the impurities include any elements other than the elements described above. Elements as the impurities may be only one kind, or may be two or more kinds.

Examples of the impurities include Sb, Sn, Co. As, Pb, Bi. and H.

Typically, Sb, Sn. Co, or As may be included in a content of, for example, 0.1% or less, Pb or Bi may be included in a content of, for example, 0.005% or less, H may be included in a content of, for example, 0.0004% or less, and the contents of the other elements need not particularly be controlled as long as being in a usual range.

From the viewpoint of obtaining the above effects of each element, the chemical composition of a base metal portion may include one or more kinds selected from the group consisting of: more than 0% but equal to or less than 1.000% of Cu, more than 0% but equal to or less than 1.000% of Ni, more than 0% but equal to or less than 1.00% of Cr, more than 0% but equal to or less than 0.50% of Mo, more than 0% but equal to or less than 0.200% of V, more than 0% but equal to or less than 0.100% of W, more than 0% but equal to or less than 0.0200% of Ca, more than 0% but equal to or less than 0.0200% of Mg, more than 0% but equal to or less than 0.0200% of Zr, and more than 0% but equal to or less than 0.0200% of REM.

The preferred ranges of the contents of these elements are as described above.

$V_{c90}$: from 2 to 150

In the chemical composition of the base metal portion. $V_{c90}$, defined by the following Formula (i), represents a value as an index of the hardenability of steel.

$V_{c90}$ is a value known as the critical cooling rate (unit: ° C./s) at which a 90% martensite structure is obtained (e.g., see Ueno et al.'s paper "New Empirical Formula for Estimating the Hardenability in place of GROSSMANN'S Equation." "Tetsu-to-Hagane" (The Iron and Steel Institute of Japan), Vol. 74 (1988). No. 6, pp. 1073-1080).

$$\log V_{c90} = 2.94 - 0.75 \beta a \quad \text{Formula (i)}$$

$$\beta a = 2.7C + 0.4Si + Mn + 0.45Ni + 0.8Cr + 2Mo \quad \text{Formula (ii)}$$

[In Formula (i), Pa represents a value defined by Formula (ii), and in Formula (ii), element symbols represent % by mass of respective elements.]

As $V_{c90}$ decreases, the hardenability of steel increases.

Therefore, in a case in which $V_{c90}$ is 150 or less, since the formation of a ferrite and a bainite is suppressed and the formation of an as-quenched martensite is promoted, it is easy to obtain a tempered martensite structure by tempering after pipe-making.

In addition, in a case in which $V_{c90}$ is 2 or more, it is advantageous in terms of cost.

In order to reduce $V_{c90}$ to less than 2, it is necessary to add a large amount of alloy elements, which requires a lot of time and cost when refining in the steelmaking process.

Therefore, $V_{c90}$ is 2 to 150.

The upper limit of $V_{c90}$ is preferably 140.

The lower limit of $V_{c90}$ is preferably 10, and more preferably 20.

Mass ratio of Ti content to N content:3.4 or more

In the chemical composition of the base metal portion, the mass ratio of Ti content to N content (hereinafter, also referred to as "Ti/N ratio" or "Ti/N") is 3.4 or more.

As the Ti/N ratio is 3.4 or more, the effect of improving hardenability by B (boron) is effectively exhibited. This point will be described in detail below.

As described above. B is an element that contributes to improving the hardenability of steel.

However, even in a case in which B is contained in steel, B existing in the form of BN (boron nitride) does not exhibit the function of improving hardenability. In this regard, when the Ti/N ratio in the steel is 3.4 or more, N in the steel is fixed in the form of TiN (titanium nitride). As a result, the formation of BN is suppressed such that an effective amount of B that contributes to the improvement of hardenability is secured. As a result, the effect of improving hardenability by B (boron) is effectively exhibited.

The Ti/N ratio is preferably 4.0 or more.

The upper limit of the Ti/N ratio depends on the range of Ti content and the range of N content. In a case in which the N content is 0%, the Ti/N ratio is infinite. The upper limit of the Ti/N ratio is preferably 80.0, more preferably 50.0, and still more preferably 40.0.

<Metallographic Microstructure of Wall Thickness Central Portion in L Cross Section at Base Metal 180° Position>

Next, the metallographic microstructure of a wall thickness central portion in an L cross section at a base metal 180° position will be described.

Here, a wall thickness central portion in an L cross section at a base metal 180° position is merely a position selected as a representative position of a base metal portion.

Therefore, in the electric resistance welded steel pipe of the disclosure, the metallographic microstructure at a position other than the wall thickness central portion in an L cross section at a 180° position in a base metal portion may have the following characteristics.

(Tempered Martensite Structure)

In the electric resistance welded steel pipe of the disclosure, a metallographic microstructure of a wall thickness central portion in an L cross section at a base metal 180° position (i.e., a position deviating by 180° in a circumferential direction of the pipe from an electric resistance welded portion) is a tempered martensite structure.

In the disclosure, the tempered martensite structure means a single-phase structure substantially consisting of a tempered martensite.

Here, the single-phase structure substantially consisting of a tempered martensite means a metallographic microstructure in which a tempered martensite has an aerial ratio of 80% or more (preferably 90% or more) in when confirmed by a method using a scanning electron microscope (SEM) described later.

Whether or not a metallographic microstructure of a wall thickness central portion in an L cross section at a base metal 180° position is a tempered martensite structure is confirmed as follows.

An L cross section (observation face) at a base metal 180° position in an electric resistance welded steel pipe is polished and then etched with a initial liquid in accordance with JIS G 0551 (2013). A micrograph of the metallographic microstructure of the wall thickness central portion on the etched L cross section (also hereinafter referred to as "metallographic micrograph") is taken by a scanning electron microscope (SEM). Metallographic micrographs corresponding to three 3,000-times visual fields (one visual field in a range of 40 μm×40 μm) are taken.

The area ratio of the tempered martensite with respect to the entire metallographic microstructure is calculated based on the metallographic micrograph taken above (SEM micrograph). In a case in which the area ratio of the tempered martensite is 80% or more, it is determined that the tempered martensite structure is formed.

Here, the tempered martensite is a structure in which the lath structure and cementite (iron carbide) can be confirmed on the SEM micrograph, and the preferential growth direction of cementite is two or more directions (i.e., random).

Meanwhile, the tempered bainite is a structure in which the lath structure and cementite (iron carbide) can be confirmed on the SEM micrograph, and the preferential growth direction of cementite is unidirectional.

A structure in which it is difficult to distinguish between the tempered martensite and the tempered bainite is determined to be the tempered martensite.

The ferrite is a structure in which the lath structure cannot be confirmed on the SEM micrograph.

The as-quenched martensite is a structure in which the lath structure can be confirmed, but cementite cannot be confirmed on the SEM micrograph.

(Average Aspect Ratio of Prior Austenite Grains)

In the electric resistance welded steel pipe of the disclosure, the average aspect ratio of prior austenite grains in the tempered martensite structure described above is 2.0 or less. As a result, the inner surface cracking resistance is improved as described above.

In a case in which the average aspect ratio of prior austenite grains exceeds 2.0, the aspect ratio of packet grains in prior austenite grains also becomes large, and as a result, the packet grain boundary is easily continuous.

For this reason, once a crack is generated on the inner surface of a bent portion upon bending forming of the electric resistance welded steel pipe, the crack may extend along the packet grain boundary and develop into a continuous crack (i.e., inner surface cracking).

The average aspect ratio of prior austenite grains is preferably 1.8 or less, and more preferably 1.6 or less.

The average aspect ratio of prior austenite grains is naturally, by definition, 1.0 or more. The average aspect ratio of prior austenite grains is preferably more than 1.0, and more preferably 1.1 or more.

Here, the average aspect ratio of prior austenite grains means the average value of aspect ratios of prior austenite grains.

The aspect ratio of a prior austenite grain means the ratio of the long axis length to the short axis length (i.e., the long axis length/short axis length ratio) when a prior austenite grain is elliptically approximated.

The average aspect ratio of a prior austenite grain is measured as follows.

The metallographic microstructure of the wall thickness central portion in the L cross section of the base metal portion (specifically a base metal 180° position in the electric resistance welded steel pipe of the disclosure) is observed using an SEM-EBSD system (at a magnification of 1,000 times), an area surrounded by a grain boundary with a tilt angle of 15° or more is regarded as a prior austenite grain, and the form of this prior austenite grain is processed by elliptical approximation. In the obtained ellipse, the ratio of a long axis length with respect to a short axis length (i.e., the long axis length/short axis length ratio) is determined as the aspect ratio of the prior austenite grain.

According to this method, the aspect ratio of every prior austenite grain in a view range of 200 μm (pipe axis direction)×500 μm (wall thickness direction) is obtained. The arithmetic mean of the obtained measurement values (aspect ratios) is calculated, and the thus obtained arithmetic mean value is determined as the average aspect ratio of the prior austenite grains.

Here, in general, the above-mentioned long axis length direction is approximately identical to the pipe axis direction of the electric resistance welded steel pipe (i.e., in the rolling direction during production of a hot-rolled steel sheet as a material), and the above-mentioned short axis length direction is approximately identical to the wall thickness direction of the electric resistance welded steel pipe.

It is possible to achieve an average aspect ratio of prior austenite grains of 2.0 or less as described above by performing rolling in a recrystallization region in the hot rolling process (e.g., by setting the hot rolling finishing temperature to 920° C. or higher).

(Average Grain Size of Packet Grains)

In the electric resistance welded steel pipe of the disclosure, the average grain size of packet grains in the tempered martensite structure (hereinafter, also referred to as "average packet grain size") is preferably 10 μm or less.

In a case in which the average packet grain size is 10 μm or less, it is possible to prevent forming strain due to bending forming from concentrating on the coarse packet grains, and the forming strain can be dispersed in each packet grain. As a result, the inner surface cracking resistance is further improved.

The average packet grain size is preferably 8 μm or less.

There is no particular limitation on the lower limit of the average packet grain size. From the viewpoint of steel production suitability, the average packet grain size is preferably 3 μm or more, and more preferably 4 μm or more.

Here, the packet grain is a unit contained in one or more prior austenite grains, and means a unit composed of a plurality of elongated crystals arranged substantially in parallel.

The average packet grain size is measured in the manner described below.

The metallographic microstructure of a wall thickness central portion in an L cross section at a base metal 180° position is observed using an SEM-EBSD system, thereby obtaining EBSD images corresponding to three 3,000-times visual fields (one visual field in a range of 40 μm×40 μm).

From the obtained EBSD images, 30 packet grains are arbitrarily selected.

At this time, a unit composed of a plurality of elongated crystals arranged substantially in parallel (specifically, a unit surrounded by a grain boundary with a tilt angle of 10° or more) is regarded as a packet grain.

Next, for the 30 selected packet grains, the equivalent circle diameter of each packet grain is obtained, and the obtained value is used as the grain size of each packet grain.

Next, the arithmetic mean value of the grain sizes of the packet grains in 30 packet grains is obtained, and the obtained arithmetic mean value is defined as the average packet grain size (i.e., the average grain size of packet grains).

An average grain size of packet grains of 10 μm or less as described above can be achieved by allowing the chemical composition of the base metal portion to include Ti, Al, and Nb in predetermined respective amounts or more; performing rolling in a recrystallization region in the hot rolling process (e.g., by setting the hot rolling finishing temperature to 920° C. or higher); or the like.

(Dislocation Density)

In the electric resistance welded steel pipe of the disclosure, a wall thickness central portion in an L cross section at a 180° position in a base metal has a dislocation density of $2.0 \times 10^{14}$ m$^{-2}$ or less.

In a case in which the dislocation density is $2.0 \times 10^{14}$ m$^{-2}$ or less, the inner surface cracking resistance is further improved.

From the viewpoint of further improving the inner surface cracking resistance, the dislocation density is preferably $1.9 \times 10^{14}$ m$^{-2}$ or less.

There is no particular limitation on the lower limit of the dislocation density. Examples of the dislocation density include $0.4 \times 10^{14}$ m$^{-2}$ and $0.6 \times 10^{14}$ m$^{-2}$.

The dislocation density in the disclosure is measured in the manner described below.

In the wall thickness central portion in an L cross section at a base metal 180° position, the half-value widths of the (110) plane, (211) plane, and (220) plane are measured by X-ray diffraction, and based on the measured values, the dislocation density is calculated according to the Williamson-Hall method (specifically, the method described in ACTA METALLURGICA Vol. 1, January 1953, pp. 22-31).

The above measurement and calculation are performed at three points in the wall thickness central portion, and the arithmetic mean value of the obtained three calculated values is defined as the dislocation density in the disclosure.

The conditions for X-ray diffraction are as follows. As an X-ray diffractometer used for X-ray diffraction, for example, "RINT2200" manufactured by Rigaku Corporation is used Tube: Mo tube (tube using Mo as a target)
Target output: 50 KV, 40 mA
Slit: 1/2° divergence slit, 1° scattering slit, 0.15 mm receiving slit
Sampling width: 0.010°
Measurement range (2θ): from 34.2° to 36.2°
Maximum number of counts: 3000 or more <Metallographic Microstructure in Vicinity of Electric Resistance Welded Portion>

In the electric resistance welded steel pipe of the disclosure, a metallographic microstructure of a vicinity of an electric resistance welded portion (i.e., an area within a distance corresponding to a wall thickness from the electric resistance welded portion) in a wall thickness central portion in a C cross section includes a tempered martensite and at least one of a tempered bainite or a ferrite.

FIG. 1 is a schematic cross-sectional view conceptually showing a part of the C cross section of the electric resistance welded steel pipe according to an example of the disclosure, which is a figure for explaining an "area within a distance corresponding to a wall thickness from the electric resistance welded portion in a wall thickness central portion in a C cross section" (i.e., a vicinity of the electric resistance welded portion).

As shown in FIG. 1, in a wall thickness central portion in a C cross section, an area V1 within a distance corresponding to wall thickness t from an electric resistance welded portion EW1 (i.e., a vicinity of the electric resistance welded portion) is an area having a length of 2 t (i.e., a length twice the wall thickness t) centered on the electric resistance welded portion EW1 on a curve corresponding to the wall thickness central portion in the C cross section. In FIG. 1, the area V1 is indicated by a one dot chain line.

The vicinity of the electric resistance welded portion in the wall thickness central portion in the C cross section is merely a position selected as a representative position of a vicinity of an electric resistance welded portion. Therefore, a metallographic microstructure of a vicinity of an electric resistance welded portion at a portion other than a wall thickness central portion in the C cross section may be a metallographic microstructure including a tempered martensite and at least one of a tempered bainite or a ferrite.

Whether or not a metallographic microstructure of a vicinity of an electric resistance welded portion in the wall thickness central portion in the C cross section includes at least one of a tempered bainite or a ferrite is confirmed as follows.

A C cross section (observation face) in an electric resistance welded steel pipe is polished and then etched with a initial liquid in accordance with JIS G 0551 (2013). An entire area within a distance corresponding to a wall thickness from an electric resistance welded portion (e.g., the area V1 described above) in the etched wall thickness central portion in a C cross section is observed by an SEM (at a magnification of 500 times) while scanning the area, thereby confirming whether or not at least one of a tempered bainite or a ferrite exists in the area.

A method of distinguishing a tempered bainite, a ferrite, and a tempered martensite on an SEM micrograph is as described above.

As described above, the metallographic microstructure in the vicinity of the electric resistance welded portion includes at least one of a tempered bainite or a ferrite, which indicates that the electric resistance welded steel pipe of the disclosure is an electric resistance welded steel pipe that has been tempered without quenching after pipe making.

In contrast to this, in the case of an electric resistance welded steel pipe that has been quenched and tempered after-pipe making, a metallographic microstructure of a vicinity of an electric resistance welded portion becomes a tempered martensite structure which is substantially free of a tempered bainite and a ferrite.

<Yield Elongation>

Yield elongation of the electric resistance welded steel pipe of the disclosure is observed when a tensile test in the pipe axis direction is performed.

Here, "yield elongation is observed" means that a substantial yield elongation (specifically, a yield elongation of 0.1% or more) is observed in a tensile test in the pipe axis direction.

A tensile test in the pipe axis direction for observing the presence or absence of yield elongation is performed under the same conditions as a tensile test in the pipe axis direction for measuring the tensile strength in the pipe axis direction, which will be described later.

As described above, yield elongation of the electric resistance welded steel pipe of the disclosure is observed when a tensile test in the pipe axis direction is performed, which indicates that the electric resistance welded steel pipe of the disclosure is an electric resistance welded steel pipe that has been tempered after pipe-making.

For example, in the case of an electric resistance welded steel pipe that has been tempered before but not after pipe-making, yield elongation is not observed.

<Tensile Strength in Pipe Axis Direction>

The electric resistance welded steel pipe of the disclosure has a tensile strength in the pipe axis direction (hereinafter, also simply referred to as "tensile strength") of from 750 to 980 MPa.

As a result of the tensile strength being 750 MPa or more, the strength of a steel pipe for a torsion beam is ensured. The tensile strength is preferably 800 MPa or more.

As a result of the tensile strength being 980 MPa or less, inner surface cracking resistance is improved. The tensile strength is preferably 950 MPa or less, and more preferably 900 MPa or less.

The tensile strength of the electric resistance welded steel pipe of the disclosure is measured in the manner described below.

A JIS 12 tensile test specimen is sampled at a base metal 180° position of the electric resistance welded steel pipe of the disclosure. The sampled JIS 12 tensile test specimen is examined by performing a tensile test in the pipe axis direction in accordance with JIS Z 2241 (2011) (i.e., tensile test with a test direction as a pipe axis direction), thereby measuring the tensile strength in the pipe axis direction. The obtained results are determined as the tensile strength (i.e., tensile strength in a pipe axis direction) of the electric resistance welded steel pipe of the disclosure.

The outer diameter of the electric resistance welded steel pipe of the disclosure is not particularly restricted. From the viewpoint of the production suitability of an electric resistance welded steel pipe, the outer diameter is preferably from 50 to 150 mm.

The wall thickness of the electric resistance welded steel pipe of the disclosure is not particularly restricted. From the viewpoint of the production suitability of an electric resistance welded steel pipe, the wall thickness of the electric resistance welded steel pipe of the disclosure is preferably from 2.0 to 4.0 mm.

<Intended Use>

The electric resistance welded steel pipe of the disclosure is used for producing a torsion beam.

Production of a torsion beam using the electric resistance welded steel pipe of the disclosure is carried out by, for example, processing a part of the electric resistance welded steel pipe of the disclosure by bending forming. Bending forming is performed by, for example, pushing a part of a linear area in parallel with the pipe axis direction of the electric resistance welded steel pipe of the disclosure in the outside-to-inside direction of the electric resistance welded steel pipe (e.g., see the bending test illustrated in FIG. 2 described later). As a result, for example, a torsion beam including a portion having an approximately V-shaped closed cross section (e.g., see FIG. 3 described later) is produced.

Usually, there is a tendency that inner surface cracking is likely to occur in a case in which the curvature radius R of the inner surface of a bent portion formed by bending forming is small.

However, according to the electric resistance welded steel pipe of the disclosure having excellent inner surface cracking resistance, the occurrence of inner surface cracking is effectively suppressed even in such a case.

Therefore, the effect of improving inner surface cracking resistance according to the electric resistance welded steel pipe of the disclosure is exerted effectively especially in a case in which the curvature radius R of the inner surface of a bent portion formed by bending forming is small.

In other words, the effect of improving inner surface cracking resistance according to the electric resistance welded steel pipe of the disclosure is exerted effectively especially in a case in which the electric resistance welded steel pipe of the disclosure is used for producing a torsion beam including a bent portion having a small curvature radius R of the inner surface (e.g., a bent portion having a curvature radius R of the inner surface that is not more than 2 times (preferably 0.7 to 2 times, and more preferably 1 to 2 times) the wall thickness).

<One Example of Production Method>

One example of a method of producing an electric resistance welded steel pipe of the present disclosure is the following production method A.

The production method A includes:

a slab preparation step of preparing a slab having the chemical composition in the disclosure:

a hot rolling step of heating the prepared slab to a slab heating temperature of from 1070° C. to 1300° C., and hot rolling the heated slab under a condition of a hot rolling finishing temperature of 920° C. or more, thereby obtaining a hot-rolled steel sheet;

a cooling step of conducting cooling of the hot-rolled steel sheet obtained in the hot rolling step under conditions that an average cooling rate from the start of cooling to 200° C. is from 40° C. to 100° C./s to achieve a coiling temperature of 200° C. or less (i.e., a cooling end temperature):

a coiling step of coiling the hot-rolled steel sheet after cooling at the above-mentioned coiling temperature, thereby obtaining a hot coil configured from the hot-rolled steel sheet:

a pipe-making step of uncoiling the hot-rolled steel sheet from the hot coil, roll-forming the uncoiled hot-rolled steel sheet to thereby make an open pipe, and processing abutting portions of the obtained open pipe by electric resistance welding to form an electric resistance welded portion, thereby obtaining an as-rolled electric resistance welded steel pipe, and a post-pipe-making tempering step of performing tempering of the as-rolled electric resistance welded steel pipe under conditions of a tempering temperature of from 500° C. to 700° C. and a tempering time of from 1 minute to 120 minutes without quenching.

The production method A may include other steps, if necessary.

The above hot rolling step, cooling step, and coiling step are carried out using a hot strip mill.

The term "as-rolled electric resistance welded steel pipe" used herein refers to an electric resistance welded steel pipe which is not subjected to heat treatment other than seam heat treatment after pipe-making. In other words, the expression "as-rolled" in the term "as-rolled electric resistance welded steel pipe "means" as is upon having been roll-formed".

According to the production method A, it is easy to produce the electric resistance welded steel pipe of the disclosure, which means an electric resistance welded steel pipe, in which
a metallographic microstructure of a wall thickness central portion in an L cross section at a base metal 180° position is a tempered martensite structure, an average aspect ratio of prior austenite grains in the tempered martensite structure is 2.0 or less,
a metallographic microstructure of vicinity of an electric resistance welded portion in a wall thickness central portion in a C cross section includes a tempered martensite and at least one of a tempered bainite or a ferrite,
yield elongation is observed when a tensile test in a pipe axis direction is performed, and a tensile strength in the pipe axis direction is from 750 to 980 MPa.

(Slab Preparation Step)

The slab preparation step of the production method A is a step of preparing a slab having the above-mentioned chemical composition.

The slab preparation step may be a step of producing a slab or a step of simply preparing preliminarily a produced slab.

In the case of slab production, for example, molten steel having the above-mentioned chemical composition is produced, and slab is produced using the produced molten steel. At such time, slab may be produced by a continuous casting method. Alternatively, slab may be produced by preparing an ingot using molten steel and processing the ingot by slabbing.

(Hot Rolling Step)

The hot rolling step of the production method A is a step of heating the prepared slab to a slab heating temperature of from 1070° C. to 1300° C., and hot rolling the heated slab under a condition of a hot rolling finishing temperature of 920° C. or more, thereby obtaining hot-rolled steel sheet.

By heating the slab to a slab heating temperature of from 1070° C. to 1300° C., it is possible to solubilize carbide, a nitride compound, and a carbonitride compound which have precipitated in the molten steel solidification process in steel. As a result, it is possible to improve strength without deterioration of inner surface cracking resistance. It is also possible to suppress generation of microvoids during roll-forming for producing an electric resistance welded steel pipe and/or bending forming on an electric resistance welded steel pipe.

In a case in which the slab heating temperature is 1070° C. or more, it is possible to sufficiently solubilize carbide, a nitride compound, and a carbonitride compound which have precipitated in the molten steel solidification process in steel.

In a case in which the slab heating temperature is 1300° C. or less, as austenite grain coarsening is suppressed, it is possible to prevent coarse AlN from precipitating during hot rolling or cooling after hot rolling.

Further, in the hot rolling step, the hot rolling finishing temperature means the end temperature of the finish rolling in hot rolling (sometimes referred to as "finish rolling outlet temperature").

When the hot rolling finishing temperature is 920° C. or more, this means that hot rolling is performed in a recrystallization region, rather than being performed in a non-recrystallization region. As a result, an electric resistance welded steel pipe to be obtained is likely to achieve an average aspect ratio of prior austenite grains of 2.0 or less.

Further, when the hot rolling finishing temperature is 920° C. or more, it contributes to refining of prior austenite grains and also to refining of packet grains in prior austenite grains. Therefore, due to the hot rolling finishing temperature being 920° C. or more, it is also easy to achieve an average packet grain size of 10 μm or less.

The upper limit of the hot rolling finishing temperature is appropriately set, but the upper limit is preferably 1000° C. from the viewpoint of further suppressing the coarsening of austenite grains.

(Cooling Step)

In the production method A, a cooling step is a step of conducting cooling of the hot-rolled steel sheet obtained in the hot rolling step under conditions that an average cooling rate from the start of cooling to 200° C. is from 40° C. to 100° C./s to achieve a coiling temperature of 200° C. or less.

In the cooling step, by conducting cooling of the hot-rolled steel sheet obtained in the hot rolling step under conditions that an average cooling rate from the start of cooling to 200° C. is 40° C./s or more to achieve a coiling temperature of 200° C. or less (i.e., a cooling end temperature), an as-quenched martensite structure is formed as a metallographic microstructure of the hot-rolled steel sheet. In other words, by this cooling step, the hot-rolled steel sheet is substantially quenched.

In the post-pipe-making tempering step described later, the as-quenched martensite structure of the base metal portion (e.g., at the base metal 180° position) generated in this cooling step is tempered such that a tempered martensite structure is formed.

Meanwhile, in a case in which the average cooling rate from the start of cooling to 200° C. is 100° C./s or less, it is easy to control the cooling termination temperature. In addition, in a case in which the average cooling rate is 100° C./s or less, the difference in the cooling rate between the surface of the hot-rolled steel sheet and the internal portion in a wall thickness direction (e.g., a wall thickness central portion) becomes small such that stability of the material of the hot-rolled steel is more excellent.

(Coiling Step)

The coiling step of the production method A is a step of coiling the hot-rolled steel sheet after cooling at the above-mentioned coiling temperature, thereby obtaining a hot coil configured from the hot-rolled steel sheet.

(Pipe-Making Step)

The pipe-making step of the production method A is a step of uncoiling the hot-rolled steel sheet from the hot coil, roll-forming the uncoiled hot-rolled steel sheet to thereby make an open pipe, and subjecting abutting portions of the obtained open pipe to electric resistance welding to form an electric resistance welded portion, thereby obtaining an as-rolled electric resistance welded steel pipe.

The pipe-making step can be carried out in accordance with a known method.

The pipe-making step may optionally include: applying seam heat treatment to an electric resistance welded portion after forming the electric resistance welded portion; reducing the outer diameter of the as-rolled electric resistance welded steel pipe by a sizer after forming the electric resistance welded portion (after seam heat treatment when conducting the seam heat treatment described above), and the like.

(Post-Pipe-Making Tempering Step)

The post-pipe-making tempering step of the production method A is a step of performing tempering of the as-rolled electric resistance welded steel pipe under conditions of a tempering temperature of from 500° C. to 700° C. and a tempering time of from 1 minute to 120 minutes without quenching.

As a result of the post-pipe-making tempering step, the as-quenched martensite structure of the base metal portion (e.g., at the base metal 180° position) is effectively tempered such that a tempered martensite structure is formed.

In a vicinity of the electric resistance welded portion, the as-quenched martensite structure is reverse-transformed into an austenite and disappears due to electric resistance welding. After electric resistance welding, the austenite is cooled and then tempered after pipe-making such that the above-described metallographic microstructure including a tempered martensite and at least one of a tempered bainite or a ferrite is formed.

In the post-pipe-making tempering step, as the tempering conditions include a tempering temperature of 500° C. or more and a tempering time of 1 minute or more, a tempered martensite structure can be effectively formed in the base metal portion.

Further, tempering under such conditions allows effectively reducing pipe-making strain, thereby effectively reducing the dislocation density.

In addition, in the post-pipe-making tempering step, as the tempering conditions include a tempering temperature of 700° C. or less and a tempering time of 120 minutes or less, strength reduction due to excessive tempering is suppressed such that a tensile strength of 750 MPa or more can be easily achieved.

In the post-pipe-making tempering step, tempering under the above conditions is performed without quenching.

Quenching as used herein refers to an operation in which a steel pipe is heat-treated at a temperature of the A3 point or higher and is rapidly cooled.

The A3 point means a temperature at which the transformation to austenite is completed during heating, and it depends on the chemical composition of the steel pipe. In the chemical composition in the disclosure, the A3 point does not fall below 700° C., and therefore, the above-described tempering does not correspond to quenching.

In the post-pipe-making tempering step, the cooling after the tempering is not particularly limited, and may be slow cooling (e.g., air cooling) or rapid cooling (e.g., water cooling).

Each of the steps of the production method A described above does not affect the chemical composition of steel.

Accordingly, the chemical composition of the base metal portion of an electric resistance welded steel pipe produced by the production method A can be considered to be identical to the chemical composition of a raw material (molten steel or slab).

EXAMPLES

Hereinafter, the present invention will be described in more detail with reference to Examples below, but the invention is not limited to these Examples.

Examples 1 to 10 and Comparative Examples 1 to 29

<Production of Electric Resistance Welded Steel Pipe>

An electric resistance welded steel pipe was obtained in each of Examples 1 to 10 according to the above-mentioned production method A.

In addition, the chemical composition or the production conditions were changed in the electric resistance welded steel pipes of the respective Examples to thereby obtain the electric resistance welded steel pipes of Comparative Examples 1 to 29.

Details are described below.

Molten steels (steels A to Z, AA, AB, and AC) having the chemical compositions set forth in Table 1 were produced in a furnace, and slabs each having a thickness of 250 mm were prepared by casting (the slab preparation step).

In Table 1, the value shown in the column of each element is the percent (%) by mass of each element.

The balance excluding the elements set forth in Table 1 is Fe and impurities.

In Table 1, REM in steel H is La.

$V_{c90}$ in Table 1 is $V_{c90}$ defined by Formula (i) described above.

Each underline in Tables 1 to 3 indicates a value that does not fall within the range of the disclosure.

Each slab obtained above was heated to the slab heating temperature set forth in Table 2 or 3, and then processed by hot-rolling under the condition of the hot-rolling finishing temperature set forth in Table 2 or 3, thereby obtaining a hot-rolled steel sheet (the hot rolling step).

Each hot-rolled steel sheet obtained in the hot rolling step was subjected to cooling at an average cooling rate set forth in Table 2 or 3 to achieve a coiling temperature set forth in Table 2 or 3 (i.e., a cooling end temperature) (cooling step).

Then, each hot-rolled steel sheet was coiled at the coiling temperature set forth in Table 2 or 3, thereby obtaining a hot coil configured from the hot-rolled steel sheet having a sheet thickness of 3.0 mm (coiling step).

The above hot rolling step, cooling step, and coiling step were carried out using a hot strip mill.

In Examples 1 to 10 and Comparative Examples 1 to 24 and 26 to 29, a pipe-making step of uncoiling the hot-rolled steel sheet from the hot coil, roll-forming the uncoiled hot-rolled steel sheet to thereby make an open pipe, and processing abutting portions of the obtained open pipe by electric resistance welding to form an electric resistance welded portion, and then reducing the diameter by a sizer, thereby obtaining an as-rolled electric resistance welded steel pipe having an outer diameter of 90 mm and a wall thickness of 3.0 mm.

In Comparative Example 25, the hot-rolled steel sheet was uncoiled from the hot coil, and the uncoiled hot-rolled steel sheet was tempered before pipe-making under the conditions set forth in Table 3 (tempering temperature and tempering time), and then the hot-rolled steel sheet was coiled again. The coiled hot-rolled steel sheet was uncoiled again, and the uncoiled hot-rolled steel sheet was used to thereby obtain an as-rolled electric resistance welded steel pipe having an outer diameter of 90 mm and a wall thickness of 3.0 mm in the same manner as in Example 1.

In Examples 1 to 10 and Comparative Examples 1 to 24 and 26 to 29, the as-rolled electric resistance welded steel pipe was tempered after pipe-making under the conditions set forth in Tables 2 and 3 (tempering temperature and tempering time), and then air-cooled to thereby obtain an electric resistance welded steel pipe having an outer diameter of 90 mm and a wall thickness of 3.0 mm (post-pipe-making tempering step).

In Comparative Example 25, the as-rolled electric resistance welded steel pipe was not tempered after pipe-making.

<Observation of L Cross Section at Base Metal 180° Position>

An L cross section at a base metal 180° position in the electric resistance welded steel pipe obtained above (as-rolled electric resistance welded steel pipe in Comparative Example 25; the same applies hereinafter) was observed, and the following confirmation and measurement were carried out.

(Metallographic Microstructure of Wall Thickness Central Portion)

The metallographic microstructure of a wall thickness central portion in the L cross section at the base metal 180° position was confirmed by the method described above.

The results are set forth in Tables 2 and 3.

In Tables 2 and 3,

"TM" means tempered martensite structure,

"TM+TB" means a dual-phase structure consisting of a tempered martensite and a tempered bainite, "F+TB" means a dual-phase structure consisting of a ferrite and a tempered bainite, and "TB" means tempered bainite structure.

(Average Aspect Ratio of Prior Austenite Grains)

The average aspect ratio of prior austenite grains (referred to as "average aspect ratio of prior γ grains" in Tables 2 and 3) of the wall thickness central portion in the L cross section was measured by the method described above.

The results are set forth in Tables 2 and 3.

(Average Packet Grain Size)

The average packet grain size at the wall thickness central portion in the L cross section was measured by the method described above.

The results are set forth in Tables 2 and 3.

(Dislocation Density)

The dislocation density of the wall thickness central portion in the L cross section was measured by the method described above. As an X-ray diffractometer used for X-ray diffraction, "RINT2200" manufactured by Rigaku Corporation was used.

The results are set forth in Tables 2 and 3.

<Observation of Vicinity of Electric Resistance Welded Portion in Wall Thickness Central Portion in C Cross Section>

A vicinity of an electric resistance welded portion in a wall thickness central portion in a C cross section (i.e., an area within a distance corresponding to a wall thickness from the electric resistance welded portion) of each of the electric resistance welded steel pipes of Examples 1 to 10 was observed by the method described above.

As a result, in each of Examples 1 to 10, a metallographic microstructure of the vicinity of the electric resistance welded portion was confirmed to include a tempered martensite and at least one of a tempered bainite or a ferrite.

<Measurement of Tensile Strength in Pipe Axis Direction>

The tensile strength in a pipe axis direction of each electric resistance welded steel pipe (hereinafter, simply referred to as "tensile strength") was measured by the method described above.

The results are set forth in Tables 2 and 3.

<Presence or Absence of Yield Elongation>

The presence or absence of yield elongation was confirmed in a tensile test in the pipe axis direction for measuring tensile strength.

In a case in which a yield elongation of 0.1% or more was observed, it was determined that the yield elongation was "present," and in a case in which a yield elongation of 0.1% or more was not observed, it was determined that the yield elongation was "absent."

<Bending Test (Evaluation of Inner Surface Crack Depth)>

Each electric resistance welded steel pipe was examined by a bending test simulating production of a torsion beam, and the inner surface crack depth was evaluated. Details are described below.

Figure 2:
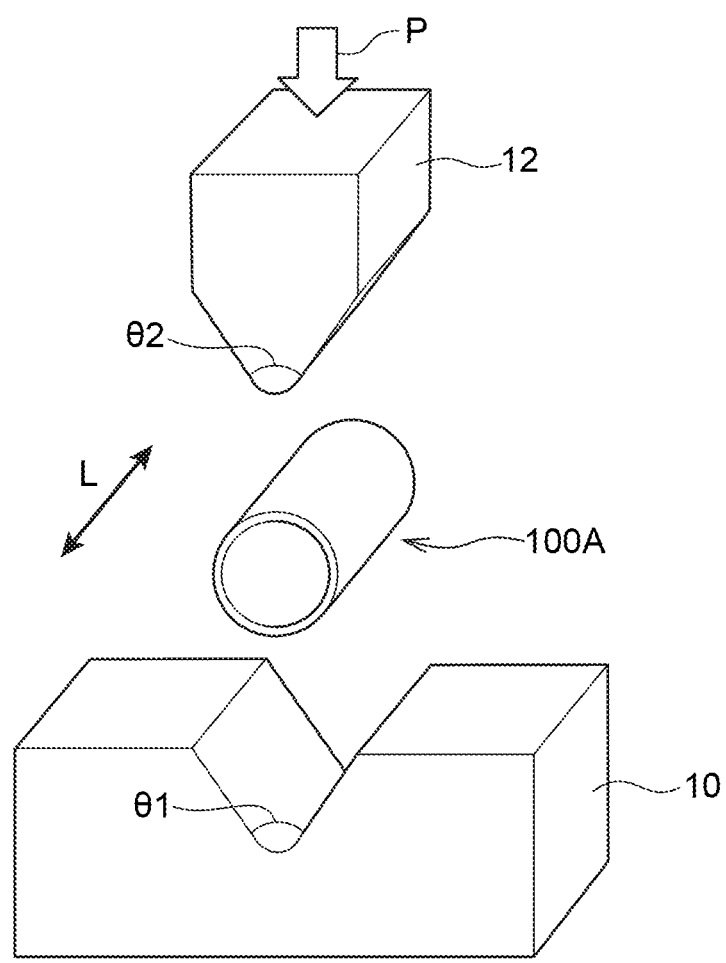
FIG. 2 is a schematic view showing the outline of the bending test in the Examples.

FIG. 2 is a schematic view showing the outline of the bending test.

As set forth in FIG. 2, an electric resistance welded steel pipe 100A, which is any of the electric resistance welded steel pipes of Examples and Comparative Examples, a lower die 10 having a V-shaped notch portion, and a punch 12 having a tip having an approximately triangular cross section were prepared.

Here, both an angle θ1 of a trough of a notch portion of a die 10 and an angle θ2 of a tip of a punch 12 were set to 60°.

In this bending test, an electric resistance welded steel pipe 100A was placed in the notch portion of the lower die 10, the punch 12 was pushed into the placed electric resistance welded steel pipe 100A in the direction of arrow P, thereby conducting bending forming of the electric resistance welded steel pipe 100A. As a result, the electric resistance welded steel pipe 100A was partially bent in a direction perpendicular to the pipe axis direction L of the electric resistance welded steel pipe 100A, thereby forming a structure 100B having an approximately V-shaped closed cross section set forth in FIG. 3.

Here, the pipe axis direction L of the electric resistance welded steel pipe 100A corresponds to the rolling direction during production of a hot-rolled steel sheet as a material for the electric resistance welded steel pipe 10A.

Figure 3:
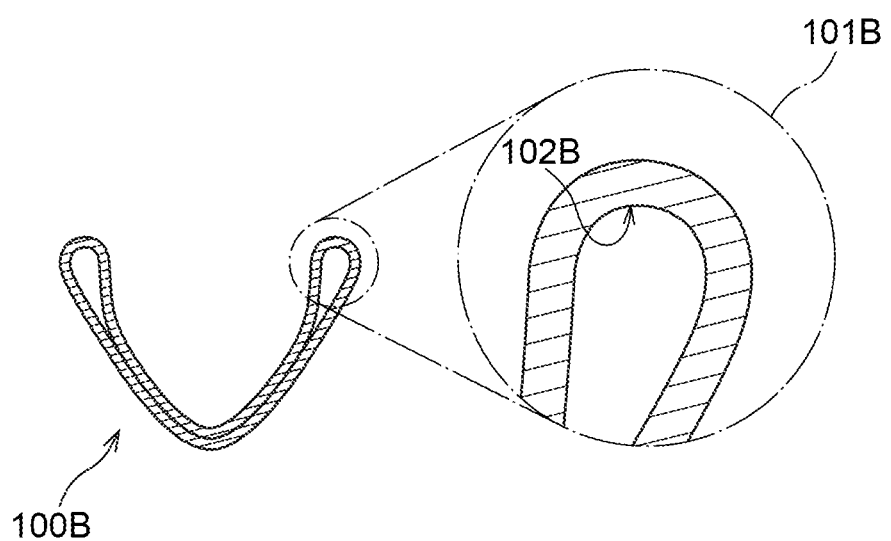
FIG. 3 is a schematic cross-sectional view schematically showing a cross section of a structure obtained by processing an electric resistance welded steel pipe by bending forming in the bending test in the Examples.

FIG. 3 is a schematic cross-sectional view schematically showing a cross section of a structure 100B obtained by processing an electric resistance welded steel pipe 100A by bending forming in the bending test. The cross section of the structure 100B set forth in FIG. 3 is a cross section perpendicular to the longitudinal direction of the structure 100B, which corresponds to a C cross section of an electric resistance welded steel pipe before bending forming (i.e., a cross section perpendicular to the pipe axis direction L).

As set forth in FIGS. 2 and 3, a structure 100B having an approximately V-shaped closed cross section was formed by processing an electric resistance welded steel pipe 100A by bending forming. Here, the amount of pushing by the punch 12 was adjusted such that the curvature radius R of an inner surface 102B was set to 4 mm at one end portion 101B (bent portion) of a closed cross section of the structure 100B. The curvature radius R for the other end portion of a closed cross section of the structure 100B was also adjusted to 4 mm.

The inner surface 102B in the cross section of the one end portion 101B (specifically, a cross section corresponding to FIG. 3) and the vicinity thereof were observed by an SEM at a magnification of 1,000 times, thereby measuring the depth of an inner surface crack (hereinafter also referred to as "inner surface crack depth").

Here, the inner surface crack depth was determined in the manner described below.

The presence or absence of an inner surface cracks was confirmed by observing the inner surface 102B in the cross section of the one end portion 101B and the vicinity thereof by SEM. In a case in which inner surface cracks were present, the linear distance between the origin and the end of a crack was determined for each inner surface crack, thereby determining the depth of each inner surface crack. The maximum value among the depths of individual inner surface cracks was designated as the "inner surface crack depth" in Examples or Comparative Examples. In a case in which no inner surface cracks were present, the "inner surface crack depth" in Examples or Comparative Examples was determined to be "0 μm."

The obtained inner surface crack depths are set forth in Tables 2 and 3.

In the evaluation of the inner surface crack depth, as the inner surface crack depth decreases, the inner surface cracking resistance becomes more excellent. When the inner surface crack depth is 0 μm, it means that no inner surface cracks are formed, indicating that remarkably excellent inner surface cracking resistance is achieved.

TABLE 1

| Steel | C | Si | Mn | P | S | Ti | Al | Nb | N | B |
|---|---|---|---|---|---|---|---|---|---|---|
| A | 0.10 | 0.25 | 1.20 | 0.015 | 0.004 | 0.020 | 0.024 | 0.034 | 0.005 | 0.0015 |
| B | 0.08 | 0.03 | 0.86 | 0.017 | 0.004 | 0.103 | 0.031 | 0.032 | 0.005 | 0.0005 |
| C | 0.12 | 1.20 | 2.50 | 0.015 | 0.004 | 0.076 | 0.025 | 0.040 | 0.001 | 0.0050 |
| D | 0.18 | 0.20 | 0.50 | 0.010 | 0.004 | 0.010 | 0.024 | 0.031 | 0.002 | 0.0010 |
| E | 0.06 | 0.24 | 0.81 | 0.030 | 0.003 | 0.030 | 0.028 | 0.022 | 0.005 | 0.0020 |
| F | 0.30 | 0.27 | 0.92 | 0.010 | 0.003 | 0.200 | 0.500 | 0.010 | 0.005 | 0.0015 |
| G | 0.22 | 0.77 | 0.30 | 0.019 | 0.004 | 0.055 | 0.026 | 0.036 | 0.004 | 0.0030 |
| H | 0.14 | 0.27 | 0.78 | 0.014 | 0.004 | 0.083 | 0.032 | 0.040 | 0.006 | 0.0018 |
| I | 0.05 | 0.28 | 1.00 | 0.016 | 0.010 | 0.020 | 0.005 | 0.034 | 0.005 | 0.0015 |
| J | 0.11 | 0.24 | 1.22 | 0.020 | 0.004 | 0.040 | 0.026 | 0.032 | 0.005 | 0.0012 |
| K | <u>0.04</u> | 0.25 | 1.20 | 0.015 | 0.004 | 0.020 | 0.024 | 0.034 | 0.005 | 0.0015 |
| L | <u>0.31</u> | 0.25 | 1.20 | 0.015 | 0.004 | 0.020 | 0.024 | 0.034 | 0.005 | 0.0015 |
| M | 0.10 | <u>0.02</u> | 1.20 | 0.015 | 0.004 | 0.020 | 0.024 | 0.034 | 0.005 | 0.0015 |
| N | 0.10 | <u>1.22</u> | 1.20 | 0.015 | 0.004 | 0.020 | 0.024 | 0.034 | 0.005 | 0.0015 |
| O | 0.10 | 0.25 | <u>0.28</u> | 0.015 | 0.004 | 0.020 | 0.024 | 0.034 | 0.005 | 0.0015 |
| P | 0.10 | 0.25 | <u>2.53</u> | 0.015 | 0.004 | 0.020 | 0.024 | 0.034 | 0.005 | 0.0015 |
| Q | 0.10 | 0.25 | 1.20 | <u>0.031</u> | 0.004 | 0.020 | 0.024 | 0.034 | 0.005 | 0.0015 |
| R | 0.10 | 0.25 | 1.20 | 0.015 | <u>0.011</u> | 0.020 | 0.024 | 0.034 | 0.005 | 0.0015 |
| S | 0.10 | 0.25 | 1.20 | 0.015 | 0.004 | <u>0.009</u> | 0.024 | 0.034 | 0.005 | 0.0015 |
| T | 0.10 | 0.25 | 1.20 | 0.015 | 0.004 | <u>0.210</u> | 0.024 | 0.034 | 0.005 | 0.0015 |
| U | 0.10 | 0.25 | 1.20 | 0.015 | 0.004 | 0.020 | <u>0.004</u> | 0.034 | 0.005 | 0.0015 |
| V | 0.10 | 0.25 | 1.20 | 0.015 | 0.004 | 0.020 | <u>0.510</u> | 0.034 | 0.005 | 0.0015 |
| W | 0.10 | 0.25 | 1.20 | 0.015 | 0.004 | 0.020 | 0.024 | <u>0.009</u> | 0.005 | 0.0015 |
| X | 0.10 | 0.25 | 1.20 | 0.015 | 0.004 | 0.020 | 0.024 | <u>0.041</u> | 0.005 | 0.0015 |
| Y | 0.10 | 0.25 | 1.20 | 0.015 | 0.004 | 0.020 | 0.024 | 0.034 | <u>0.007</u> | 0.0015 |
| Z | 0.10 | 0.25 | 1.20 | 0.015 | 0.004 | 0.020 | 0.024 | 0.034 | 0.005 | <u>0.0004</u> |
| AA | 0.10 | 0.25 | 1.20 | 0.015 | 0.004 | 0.020 | 0.024 | 0.034 | 0.005 | <u>0.0051</u> |
| AB | 0.10 | 0.25 | 0.50 | 0.015 | 0.004 | 0.020 | 0.024 | 0.034 | 0.005 | 0.0015 |
| AC | 0.10 | 0.25 | 1.20 | 0.015 | 0.004 | 0.012 | 0.024 | 0.034 | 0.005 | 0.0015 |

| Steel | Cu | Ni |
|---|---|---|
| A | | |
| B | | |
| C | | |
| D | | |
| E | | |
| F | 0.098 | |
| G | | |
| H | | 0.176 |
| I | | |
| J | | 0.134 |

| Steel | Cr | Mo | V | W | Ca | Mg | Zr | REM | $V_{c90}$ | Ti/N |
|---|---|---|---|---|---|---|---|---|---|---|
| A | | | | | 0.0032 | | | | 57.9 | 4.0 |
| B | | | | | | | | | 132.9 | 20.8 |
| C | | | | | 0.0025 | | | | 2.9 | 75.6 |
| D | | | | | 0.0034 | | | | 138.2 | 5.0 |
| E | | | | | 0.0018 | | | | 138.2 | 6.4 |
| F | 0.08 | | | | | | | | 32.3 | 36.6 |
| G | 0.12 | | | | 0.0026 | | | | 92.6 | 13.7 |
| H | | 0.36 | 0.010 | | 0.0011 | 0.0002 | | 0.0013 | 24.7 | 15.0 |
| I | | | | 0.010 | | | | | 100.3 | 4.4 |
| J | | | | | 0.0050 | | 0.0004 | | 48.5 | 8.6 |
| K | | | | | 0.0034 | | | | 76.6 | 4.0 |
| L | | | | | | | | | 21.7 | 4.0 |
| M | | | | | 0.0036 | | | | 67.8 | 4.0 |
| N | | | | | | | | | 29.6 | 4.0 |
| O | | | | | | | | | <u>283.5</u> | 4.0 |
| P | | | | | 0.0023 | | | | 5.8 | 4.0 |
| Q | | | | | | | | | 57.9 | 4.0 |
| R | | | | | 0.0018 | | | | 57.9 | 4.0 |
| S | | | | | | | | | 57.9 | <u>1.8</u> |
| T | | | | | | | | | 57.9 | 42.0 |
| U | | | | | 0.0025 | | | | 57.9 | 4.0 |
| V | | | | | | | | | 57.9 | 4.0 |
| W | | | | | 0.0016 | | | | 57.9 | 4.0 |
| X | | | | | | | | | 57.9 | 4.0 |
| Y | | | | | 0.0012 | | | | 57.9 | <u>2.9</u> |
| Z | | | | | | | | | 57.9 | 4.0 |
| AA | | | | | | | | | 57.9 | 4.0 |
| AB | | | | | 0.0032 | | | | <u>193.9</u> | 4.0 |
| AC | | | | | 0.0032 | | | | 57.9 | <u>2.4</u> |

TABLE 2

| | | Hot-rolled steel sheet production condition | | | | Tempering before pipe-making | | Tempering after pipe-making | | Electric resistance welded steel pipe Wall thickness central portion in an L cross section at base metal 180° position | | | | | | |
|---|---|---|---|---|---|---|---|---|---|---|---|---|---|---|---|---|
| | Steel | Slab heating temperature (° C.) | Hot rolling finishing temperature (° C.) | Average cooling rate (° C./s) | Coiling temperature (° C.) | Tempering temperature (° C.) | Tempering time (min) | Tempering temperature (° C.) | Tempering time (min) | Metallographic microstructure | Average aspect ratio of prior γ grains | Average packet grain size (μm) | Dislocation density (×10$^{14}$ m$^{-2}$) | Tensile strength (MPa) | Presence or absence of yield elongation | Inner surface crack depth (μm) |
| Example 1 | A | 1200 | 940 | 50 | 50 | — | — | 600 | 60 | TM | 1.5 | 5 | 0.8 | 780 | Present | 0 |
| Example 2 | B | 1200 | 940 | 100 | 200 | — | — | 600 | 60 | TM | 1.5 | 5 | 0.7 | 850 | Present | 0 |
| Example 3 | C | 1200 | 940 | 50 | 50 | — | — | 500 | 60 | TM | 1.5 | 4 | 1.9 | 850 | Present | 0 |
| Example 4 | D | 1200 | 920 | 50 | 50 | — | — | 560 | 120 | TM | 1.9 | 10 | 0.9 | 750 | Present | 0 |
| Example 5 | E | 1200 | 940 | 40 | 50 | — | — | 600 | 60 | TM | 1.5 | 5 | 0.8 | 800 | Present | 0 |
| Example 6 | F | 1200 | 940 | 50 | 50 | — | — | 700 | 1 | TM | 1.5 | 5 | 1.2 | 900 | Present | 0 |
| Example 7 | G | 1200 | 1000 | 50 | 50 | — | — | 600 | 60 | TM | 1.2 | 4 | 0.8 | 890 | Present | 0 |
| Example 8 | H | 1200 | 940 | 70 | 50 | — | — | 620 | 60 | TM | 1.5 | 5 | 0.6 | 890 | Present | 0 |
| Example 9 | I | 1200 | 940 | 80 | 50 | — | — | 600 | 18 | TM | 1.5 | 5 | 0.9 | 760 | Present | 0 |
| Example 10 | J | 1200 | 940 | 50 | 50 | — | — | 600 | 60 | TM | 1.5 | 5 | 0.8 | 850 | Present | 0 |
| Comparative Example 1 | K | 1200 | 940 | 50 | 50 | — | — | 600 | 60 | TM | 1.5 | 5 | 0.8 | 560 | Present | 0 |
| Comparative Example 2 | L | 1200 | 940 | 50 | 50 | — | — | 600 | 60 | TM | 1.5 | 5 | 0.9 | 1010 | Present | 30 |
| Comparative Example 3 | M | 1200 | 940 | 50 | 50 | — | — | 600 | 60 | TM | 1.5 | 5 | 0.8 | 780 | Present | 10 |
| Comparative Example 4 | N | 1200 | 940 | 50 | 50 | — | — | 600 | 60 | TM | 1.5 | 5 | 0.8 | 780 | Present | 10 |
| Comparative Example 5 | O | 1200 | 940 | 50 | 50 | — | — | 600 | 60 | TM+TB | 1.5 | 5 | 0.6 | 700 | Present | 5 |
| Comparative Example 6 | P | 1200 | 940 | 50 | 50 | — | — | 600 | 60 | TM | 1.5 | 5 | 1.0 | 990 | Present | 20 |
| Comparative Example 7 | Q | 1200 | 940 | 50 | 50 | — | — | 600 | 60 | TM | 1.5 | 5 | 0.8 | 780 | Present | 10 |
| Comparative Example 8 | R | 1200 | 940 | 50 | 50 | — | — | 600 | 60 | TM | 1.5 | 5 | 0.8 | 780 | Present | 10 |
| Comparative Example 9 | S | 1200 | 940 | 50 | 50 | — | — | 600 | 60 | F+TB | 1.5 | 13 | 0.6 | 570 | Present | 15 |
| Comparative Example 10 | T | 1200 | 940 | 50 | 50 | — | — | 600 | 60 | TM | 1.5 | 5 | 0.8 | 780 | Present | 10 |
| Comparative Example 11 | U | 1200 | 940 | 50 | 50 | — | — | 600 | 60 | TM | 1.5 | 12 | 0.8 | 780 | Present | 10 |

TABLE 2-continued

| | | Hot-rolled steel sheet production condition | | | | Tempering before pipe-making | | Tempering after pipe-making | | Electric resistance welded steel pipe Wall thickness central portion in an L cross section at base metal 180° position | | | | | | |
|---|---|---|---|---|---|---|---|---|---|---|---|---|---|---|---|---|
| | Steel | Slab heating temperature (°C.) | Hot rolling finishing temperature (°C.) | Average cooling rate (°C./s) | Coiling temperature (°C.) | Tempering temperature (°C.) | Tempering time (min) | Tempering temperature (°C.) | Tempering time (min) | Metallographic microstructure | Average aspect ratio of prior γ grains | Average packet grain size (μm) | Dislocation density (×10$^{14}$ m$^{-2}$) | Tensile strength (MPa) | Presence or absence of yield elongation | Inner surface crack depth (μm) |
| Comparative Example 12 | V | 1200 | 940 | 50 | 50 | — | — | 600 | 60 | TM | 1.5 | 5 | 0.8 | 780 | Present | 10 |
| Comparative Example 13 | W | 1200 | 940 | 50 | 50 | — | — | 600 | 60 | TM | 1.5 | 11 | 0.8 | 780 | Present | 10 |
| Comparative Example 14 | X | 1200 | 940 | 50 | 50 | — | — | 600 | 60 | TM | 1.5 | 5 | 0.8 | 780 | Present | 15 |
| Comparative Example 15 | Y | 1200 | 940 | 50 | 50 | — | — | 600 | 60 | F+TB | 1.5 | 5 | 0.8 | 700 | Present | 10 |
| Comparative Example 16 | Z | 1200 | 940 | 50 | 50 | — | — | 600 | 60 | F+TB | 1.5 | 5 | 0.6 | 580 | Present | 15 |
| Comparative Example 17 | AA | 1200 | 940 | 50 | 50 | — | — | 600 | 60 | TM+TB | 1.5 | 5 | 0.8 | 650 | Present | 20 |

TABLE 3

| | | Hot-rolled steel sheet production condition | | | | Tempering before pipe-making | | Tempering after pipe-making | | Electric resistance welded steel pipe Wall thickness central portion in an L cross section at base metal 180° position | | | | | | |
|---|---|---|---|---|---|---|---|---|---|---|---|---|---|---|---|---|
| | Steel | Slab heating temperature (°C.) | Hot rolling finishing temperature (°C.) | Average cooling rate (°C./s) | Coiling temperature (°C.) | Tempering temperature (°C.) | Tempering time (min) | Tempering temperature (°C.) | Tempering time (min) | Metallographic microstructure | Average aspect ratio of prior γ grains | Average packet grain size (μm) | Dislocation density (×10$^{14}$ m$^{-2}$) | Tensile strength (MPa) | Presence or absence of yield elongation | Inner surface crack depth (μm) |
| Comparative Example 18 | A | 1200 | 940 | 50 | 50 | — | — | 600 | 60 | TM | 2.1 | 11 | 0.8 | 780 | Present | 5 |
| Comparative Example 19 | A | 1200 | 940 | 39 | 50 | — | — | 600 | 60 | TM+TB | 1.5 | 5 | 0.8 | 740 | Present | 5 |
| Comparative Example 20 | A | 1200 | 940 | 50 | 500 | — | — | 600 | 60 | F+TB | 1.5 | 5 | 0.6 | 580 | Present | 15 |
| Comparative Example 21 | A | 1200 | 940 | 50 | 50 | — | — | 310 | 60 | TM | 1.5 | 5 | 5.9 | 870 | Absent | 20 |
| Comparative Example 22 | A | 1200 | 940 | 50 | 50 | — | — | 740 | 60 | TM | 1.5 | 5 | 0.4 | 560 | Present | 0 |

TABLE 3-continued

| | | Hot-rolled steel sheet production condition | | | | Tempering before pipe-making | | Tempering after pipe-making | | Electric resistance welded steel pipe Wall thickness central portion in an L cross section at base metal 180° position | | | | | | |
|---|---|---|---|---|---|---|---|---|---|---|---|---|---|---|---|---|
| | Steel | Slab heating temperature (° C.) | Hot rolling finishing temperature (° C.) | Average cooling rate (° C./s) | Coiling temperature (° C.) | Tempering temperature (° C.) | Tempering time (min) | Tempering temperature (° C.) | Tempering time (min) | Metallographic microstructure | Average aspect ratio of prior γ grains | Average packet grain size (μm) | Dislocation density (×10$^{14}$ m$^{-2}$) | Tensile strength (MPa) | Presence or absence of yield elongation | Inner surface crack depth (μm) |
| Comparative Example 23 | A | 1200 | 940 | 50 | 50 | — | — | 600 | 0.9 | TM | 1.5 | 5 | 2.1 | 800 | Absent | 5 |
| Comparative Example 24 | A | 1200 | 940 | 50 | 50 | — | — | 600 | 150 | TM | 1.5 | 5 | 0.4 | 570 | Present | 0 |
| Comparative Example 25 | A | 1200 | 940 | 50 | 50 | 600 | 60 | — | — | TM | 1.5 | 5 | 7.1 | 840 | Absent | 60 |
| Comparative Example 26 | A | 1200 | 850 | 50 | 50 | — | — | 600 | 60 | TM | 5.2 | 13 | 0.9 | 790 | Present | 15 |
| Comparative Example 27 | A | 1200 | 940 | 50 | 400 | — | — | 600 | 60 | TB | 1.5 | 5 | 0.6 | 580 | Present | 10 |
| Comparative Example 28 | AB | 1200 | 940 | 50 | 50 | — | — | 600 | 60 | TM+TB | 1.5 | 5 | 0.8 | 610 | Present | 15 |
| Comparative Example 29 | AC | 1200 | 940 | 50 | 50 | — | — | 600 | 60 | TM+TB | 1.5 | 5 | 0.8 | 630 | Present | 10 |

As shown in Table 2, excellent tensile strength in a range of from 750 MPa to 980 MPa and excellent inner surface cracking resistance were confirmed for the electric resistance welded steel pipes of Examples 1 to 10, each of which has the chemical composition in the disclosure, and in which a metallographic microstructure of a wall thickness central portion in an L cross section at a base metal 180° position is a tempered martensite structure, an average aspect ratio of prior austenite grains in the tempered martensite structure is 2.0 or less, and yield elongation is observed when a tensile test in the pipe axis direction is performed.

The results of the Comparative Examples shown in Table 2 with respect to the above Examples are as follows.

In Comparative Example 1 in which the C content was excessively small, the tensile strength was insufficient.

In Comparative Example 2 in which the C content was excessively large, the tensile strength became excessive and the inner surface cracking resistance deteriorated.

In Comparative Example 3 in which the Si content was excessively small, the inner surface cracking resistance deteriorated. This is thought to be because deoxidation was insufficient, and thus coarse Fe oxide was generated.

In Comparative Example 4 in which the Si content was excessively large, inner surface cracking resistance deteriorated. This is thought to be because an inclusion such as SiO$_2$ was generated, thereby facilitating generation of microvoids starting from the inclusion during roll-forming for producing an electric resistance welded steel pipe and/or bending forming on an electric resistance welded steel pipe.

In Comparative Example 5 in which the Mn content was excessively small, the metallographic microstructure of a wall thickness central portion in an L cross section at a base metal 180° position was a dual-phase structure consisting of a tempered martensite and a tempered bainite but not a tempered martensite structure, and thus the tensile strength became insufficient, and the inner surface cracking resistance deteriorated.

In Comparative Example 6 in which the Mn content was excessively large, the tensile strength became excessive, and the inner surface cracking resistance deteriorated.

In Comparative Example 7 in which the P content was excessively large, the inner surface cracking resistance deteriorated. This is thought to be because P was concentrated at the packet grain boundary.

In Comparative Example 8 in which the S content was excessively large, the inner surface cracking resistance deteriorated. This is thought to be because coarse MnS was generated.

In Comparative Example 9 in which the Ti content was excessively small, Ti/N was less than 3.4, and the metallographic microstructure of a wall thickness central portion in an L cross section at a base metal 180° position was a dual-phase structure consisting of a ferrite and a tempered bainite but not a tempered martensite structure, and thus the tensile strength became insufficient and the inner surface cracking resistance deteriorated. This is thought to be because N could not be fixed in the form of TiN, and BN was generated, and as a result, the effect of improving hardenability by B became insufficient.

In Comparative Example 10 in which the Ti content was excessively large, the inner surface cracking resistance deteriorated. This is thought to be because coarse TiC and/or TiN precipitated In Comparative Example 11 in which the Al content was excessively small, the inner surface cracking resistance deteriorated. This is thought to be because prior austenite grains became coarse, and the packet grains in prior austenite grains also became coarse.

In Comparative Example 12 in which the Al content was excessively large, the inner surface cracking resistance deteriorated. This is thought to be because coarse AlN was generated.

In Comparative Example 13 in which the Nb content was excessively small, the inner surface cracking resistance deteriorated. This is thought to be because prior austenite grains became coarse, and the packet grains in prior austenite grains also became coarse.

In Comparative Example 14 in which the Nb content was excessively large, the inner surface cracking resistance deteriorated. This is thought to be because coarse NbC was generated.

In Comparative Example 15 in which the N content was excessively large, the inner surface cracking resistance deteriorated. This is thought to be because coarse AlN was generated. Also in Comparative Example 15, Ti/N was less than 3.4, and the metallographic microstructure of a wall thickness central portion in an L cross section at a base metal 180° position was a dual-phase structure consisting of a ferrite and a tempered bainite, and thus the tensile strength became insufficient. This is thought to be because N could not be fixed in the form of TiN, and BN was generated, and as a result, the effect of improving hardenability by B became insufficient.

In Comparative Example 16 in which the B content was excessively small, the metallographic microstructure of a wall thickness central portion in an L cross section at a base metal 180° position was a dual-phase structure consisting of a ferrite and a tempered bainite but not a tempered martensite structure, and thus the tensile strength became insufficient, and the inner surface cracking resistance deteriorated. This is thought to be because the B content was excessively small, and thus hardenability became insufficient.

In Comparative Example 17 in which the B content was excessively large, the metallographic microstructure of a wall thickness central portion in an L cross section at a base metal 180° position was a dual-phase structure consisting of a tempered martensite and a tempered bainite but not a tempered martensite structure, and thus the tensile strength became insufficient, and the inner surface cracking resistance deteriorated. This is thought to be because since B aggregated and/or precipitated, the solid solution B segregated at the austenite grain boundary decreased, and thus hardenability decreased.

The results of the Comparative Examples shown in Table 3 with respect to the above Examples are as follows.

In Comparative Example 18, which had the chemical composition of the disclosure, but the hot rolling finishing temperature was excessively low, the average aspect ratio of prior austenite grains was more than 2.0, and the inner surface cracking resistance deteriorated.

In Comparative Example 19, which had the chemical composition of disclosure, but in which the cooling rate when cooling the hot-rolled steel sheet was excessively slow, the metallographic microstructure of a wall thickness central portion in an L cross section at a base metal 180° position was a dual-phase structure consisting of a tempered martensite and a tempered bainite but not a tempered martensite structure, and thus the tensile strength became insufficient, and the inner surface cracking resistance deteriorated.

In Comparative Example 20, which had the chemical composition of disclosure, but in which the coiling temperature when coiling the hot-rolled steel sheet (i.e., the cooling end temperature) was excessively high, the metallographic microstructure of a wall thickness central portion in an L cross section at a base metal 180° position was a dual-phase structure consisting of a ferrite and a tempered bainite but not a tempered martensite structure, and thus the tensile strength became insufficient, and the inner surface cracking resistance deteriorated.

In Comparative Example 21, which had the chemical composition of disclosure, but in which the tempering temperature in tempering after pipe-making was excessively low, yield elongation was not observed, and the inner surface cracking resistance deteriorated.

In Comparative Example 22, which had the chemical composition of disclosure, but in which the tempering temperature in tempering after pipe-making was excessively high, the tensile strength was insufficient.

In Comparative Example 23, which had the chemical composition of disclosure, but in which the tempering time in tempering after pipe-making was excessively short, yield elongation was not observed, and the inner surface cracking resistance deteriorated.

In Comparative Example 24, which had the chemical composition of disclosure, but in which the tempering time in tempering after pipe-making was excessively long, the tensile strength was insufficient.

In Comparative Example 25, which had the chemical composition of disclosure, but in which tempering was performed before but not after pipe-making, yield elongation was not observed, and the inner surface cracking resistance deteriorated.

In Comparative Example 26, which had the chemical composition of the disclosure, but the hot rolling finishing temperature was excessively low, the average aspect ratio of prior austenite grains was more than 2.0, and the inner surface cracking resistance deteriorated.

In Comparative Example 27, which had the chemical composition of disclosure, but in which the coiling temperature when coiling the hot-rolled steel sheet (i.e., the cooling end temperature) was excessively high, the metallographic microstructure of a wall thickness central portion in an L cross section at a base metal 180° position was a tempered bainite structure but not a tempered martensite structure, and thus the tensile strength became insufficient, and the inner surface cracking resistance deteriorated.

In Comparative Example 28 in which the content of each element in the chemical composition of the disclosure is appropriate, but $V_{c90}$ exceeds 150, the metallographic microstructure of a wall thickness central portion in an L cross section at a base metal 180° position was a dual-phase structure consisting of a tempered martensite and a tempered bainite but not a tempered martensite structure, and thus the tensile strength became insufficient, and the inner surface cracking resistance deteriorated.

In Comparative Example 29 in which the content of each element in the chemical composition of the disclosure is appropriate, but Ti/N is less than 3.4, the metallographic microstructure of a wall thickness central portion in an L cross section at a base metal 180° position was a dual-phase structure consisting of a tempered martensite and a tempered bainite, and thus the tensile strength became insufficient. This is thought to be because N could not be fixed in the form of TiN, and BN was generated, and as a result, the effect of improving hardenability by B became insufficient.

The invention claimed is:

1. An electric resistance welded steel pipe for a torsion beam, the steel pipe having an outer diameter of from 50 to 150 mm and a wall thickness of from 2.0 to 4.0 mm, and the steel pipe comprising a base metal portion and an electric resistance welded portion,
wherein a chemical composition of the base metal portion consists of, in terms of % by mass:
0.05 to 0.30% of C,
0.03 to 1.20% of Si,
0.30 to 2.50% of Mn,
0 to 0.030% of P,
0 to 0.010% of S,
0.010 to 0.200% of Ti,
0.005 to 0.500% of Al,
0.010 to 0.040% of Nb,
0 to 0.006% of N,
0.0005 to 0.0050% of B,
0 to 1.000% of Cu,
0 to 1.000% of Ni,
0 to 1.00% of Cr,
0 to 0.50% of Mo,
0 to 0.200% of V,
0 to 0.100% of W,
0 to 0.0200% of Ca,
0 to 0.0200% of Mg,
0 to 0.0200% of Zr,
0 to 0.0200% of REM, and,
a balance consisting of Fe and impurities, wherein:
$V_{c90}$, defined by the following Formula (i), is from 2 to 150,
a mass ratio of Ti content to N content is 3.4 or more,
a metallographic microstructure of a wall thickness central portion is a tempered martensite structure, and an average aspect ratio of prior austenite grains in the tempered martensite structure is 2.0 or less, in an L cross section at a position deviating by 180° in a circumferential direction of the pipe from the electric resistance welded portion,
a metallographic microstructure of an area within a distance corresponding to a wall thickness from the electric resistance welded portion in a wall thickness central portion in a C cross section includes a tempered martensite and at least one of a tempered bainite or a ferrite,
yield elongation is observed when a tensile test in a pipe axis direction is performed, and
a tensile strength in the pipe axis direction is from 750 to 980 MPa:

$$\log V_{c90} = 2.94 - 0.75\beta a \quad \text{Formula (i)}$$

$$\beta a = 2.7C + 0.4Si + Mn + 0.45Ni + 0.8Cr + 2Mo \quad \text{Formula (ii)}$$

wherein, in Formula (i), Pa represents a value defined by Formula (ii), and in Formula (ii), element symbols represent % by mass of respective elements.

2. The electric resistance welded steel pipe for a torsion beam according to claim 1, wherein the chemical composition of the base metal portion contains, in terms of % by mass, at least one selected from the group consisting of:
more than 0% but equal to or less than 1.000% of Cu,
more than 0% but equal to or less than 1.000% of Ni,
more than 0% but equal to or less than 1.00% of Cr,
more than 0% but equal to or less than 0.50% of Mo,
more than 0% but equal to or less than 0.200% of V,
more than 0% but equal to or less than 0.100% of W,
more than 0% but equal to or less than 0.0200% of Ca,
more than 0% but equal to or less than 0.0200% of Mg,
more than 0% but equal to or less than 0.0200% of Zr, and
more than 0% but equal to or less than 0.0200% of REM.

3. The electric resistance welded steel pipe for a torsion beam according to claim 1, wherein packet grains in the tempered martensite structure have an average grain size of 10 μm or less.

4. The electric resistance welded steel pipe for a torsion beam according to claim 1, wherein the wall thickness central portion in the L cross section has a dislocation density of $2.0 \times 10^{14}$ m$^{-2}$ or less.

5. An electric resistance welded steel pipe for a torsion beam, the steel pipe having an outer diameter of from 50 to 150 mm and a wall thickness of from 2.0 to 4.0 mm, and the steel pipe comprising a base metal portion and an electric resistance welded portion,
wherein a chemical composition of the base metal portion comprising, in terms of % by mass:
0.05 to 0.30% of C,
0.03 to 1.20% of Si,
0.30 to 2.50% of Mn,
0 to 0.030% of P,
0 to 0.010% of S,
0.010 to 0.200% of Ti,
0.005 to 0.500% of Al,
0.010 to 0.040% of Nb,
0 to 0.006% of N,
0.0005 to 0.0050% of B,
0 to 1.000% of Cu,
0 to 1.000% of Ni,
0 to 1.00% of Cr,
0 to 0.50% of Mo,
0 to 0.200% of V,
0 to 0.100% of W,
0 to 0.0200% of Ca,
0 to 0.0200% of Mg,
0 to 0.0200% of Zr,
0 to 0.0200% of REM, and,
a balance comprising Fe and impurities, wherein:
$V_{c90}$, defined by the following Formula (i), is from 2 to 150,
a mass ratio of Ti content to N content is 3.4 or more,
a metallographic microstructure of a wall thickness central portion is a tempered martensite structure, and an average aspect ratio of prior austenite grains in the tempered martensite structure is 2.0 or less, in an L cross section at a position deviating by 180° in a circumferential direction of the pipe from the electric resistance welded portion,
a metallographic microstructure of an area within a distance corresponding to a wall thickness from the electric resistance welded portion in a wall thickness central portion in a C cross section includes a tempered martensite and at least one of a tempered bainite or a ferrite,
yield elongation is observed when a tensile test in a pipe axis direction is performed, and
a tensile strength in the pipe axis direction is from 750 to 980 MPa:

$$\log V_{c90} = 2.94 - 0.75\beta a \quad \text{Formula (i)}$$

$$\beta a = 2.7C + 0.4Si + Mn + 0.45Ni + 0.8Cr + 2Mo \quad \text{Formula (ii)}$$

wherein, in Formula (i), Pa represents a value defined by Formula (ii), and in Formula (ii), element symbols represent % by mass of respective elements.

6. The electric resistance welded steel pipe for a torsion beam according to claim 5, wherein the chemical composition of the base metal portion contains, in terms of % by mass, at least one selected from the group consisting of:
more than 0% but equal to or less than 1.000% of Cu,
more than 0% but equal to or less than 1.000% of Ni,
more than 0% but equal to or less than 1.00% of Cr,
more than 0% but equal to or less than 0.50% of Mo,
more than 0% but equal to or less than 0.200% of V,
more than 0% but equal to or less than 0.100% of W,
more than 0% but equal to or less than 0.0200% of Ca,
more than 0% but equal to or less than 0.0200% of Mg,
more than 0% but equal to or less than 0.0200% of Zr, and
more than 0% but equal to or less than 0.0200% of REM.

7. The electric resistance welded steel pipe for a torsion beam according to claim 5, wherein packet grains in the tempered martensite structure have an average grain size of 10 μm or less.

8. The electric resistance welded steel pipe for a torsion beam according to claim 5, wherein the wall thickness central portion in the L cross section has a dislocation density of $2.0 \times 10^{14}$ m$^{-2}$ or less.

* * * * *